United States Patent [19]
Aiena

[11] 4,147,967
[45] Apr. 3, 1979

[54] APPARATUS AND METHOD FOR CONTROLLING THE VELOCITY OF A MOVEABLE MEMBER

[75] Inventor: Peter P. Aiena, Kettering, Ohio

[73] Assignee: NCR Corporation, Dayton, Ohio

[21] Appl. No.: 850,169

[22] Filed: Nov. 10, 1977

[51] Int. Cl.² .............................................. G05B 11/28
[52] U.S. Cl. .................................... 318/341; 318/603; 364/519
[58] Field of Search .......................... 100/47; 364/519; 318/603, 594, 599, 341

[56] References Cited

U.S. PATENT DOCUMENTS

| | | | |
|---|---|---|---|
| 3,584,284 | 6/1971 | Beach et al. | 318/603 X |
| 3,670,228 | 6/1972 | Crosby | 318/594 |
| 3,828,236 | 1/1973 | Close | 318/561 |
| 3,838,325 | 9/1973 | Kobayashi | 318/341 X |
| 3,889,169 | 10/1973 | Hirschman et al. | 318/603 X |
| 3,922,671 | 6/1974 | Tripp | 318/603 X |
| 3,949,286 | 4/1976 | Appelgren | 318/603 X |
| 3,950,682 | 4/1976 | Dohanich | 318/341 X |
| 3,967,176 | 6/1976 | Wagener et al. | 318/603 |
| 3,986,091 | 10/1976 | Qulogue et al. | 318/603 |

OTHER PUBLICATIONS

IBM Tech. Discl. Bulletin, "Grating Position Up Down Counter", Carmichael et al., vol. 16 #10, 3/74.

Primary Examiner—B. Dobeck
Attorney, Agent, or Firm—J. T. Cavender; Albert L. Sessler, Jr.; Elmer Wargo

[57] ABSTRACT

An apparatus and method for controlling the velocity of a moving member like, for example, a print head carrier. A processor is utilized for controlling the velocity of the carrier with respect to a desired nominal velocity and for performing additional operations such as grouping of characters to be printed, firing print actuators, etc. associated with a printing function. The additional operations have predetermined associated time periods which are used in conjunction with successive signals from a timing strip associated with the carrier to produce a first count which corresponds to the actual velocity of the carrier. The first count is compared by the processor with a second count representing the desired nominal velocity of the carrier to determine underspeed and overspeed conditions, and, additionally, acceleration and deceleration conditions are determined and used in providing an output count which is utilized by a modulator for controlling an energizing "on period" and a deenergizing "off period" to a motor driving the carrier so as to minimize "undershoot" and "overshoot" of the carrier relative to the desired nominal velocity.

24 Claims, 18 Drawing Figures

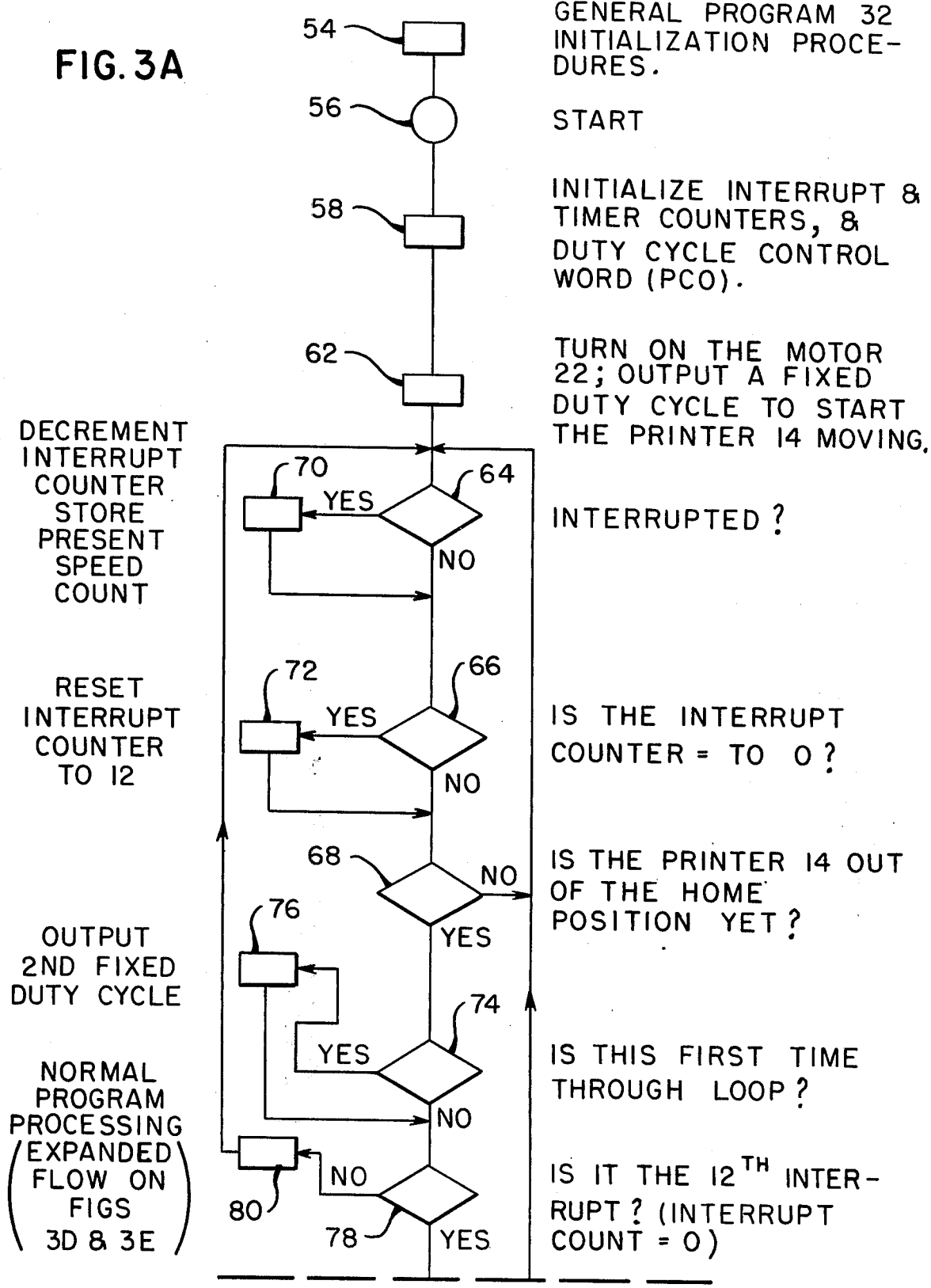

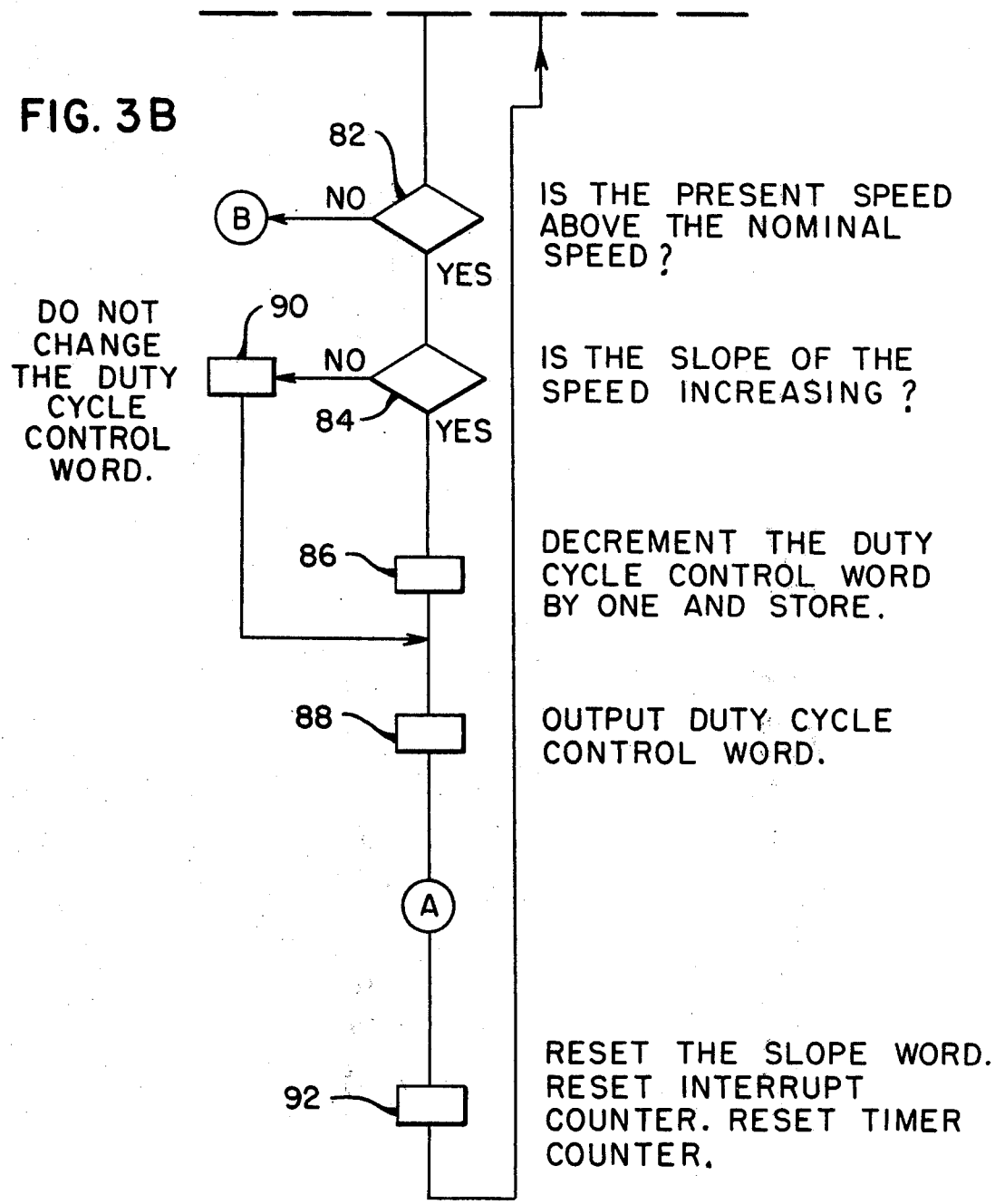

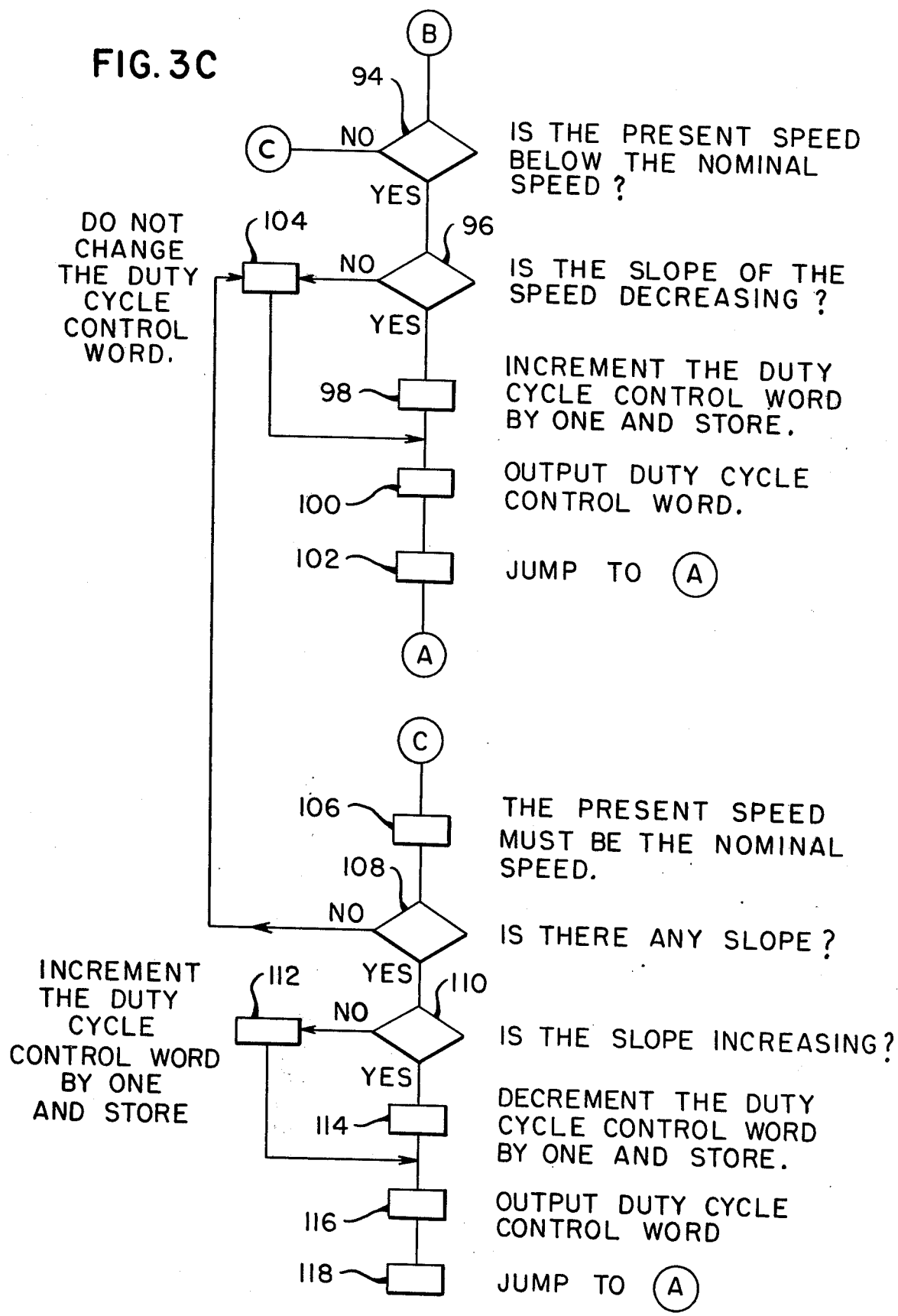

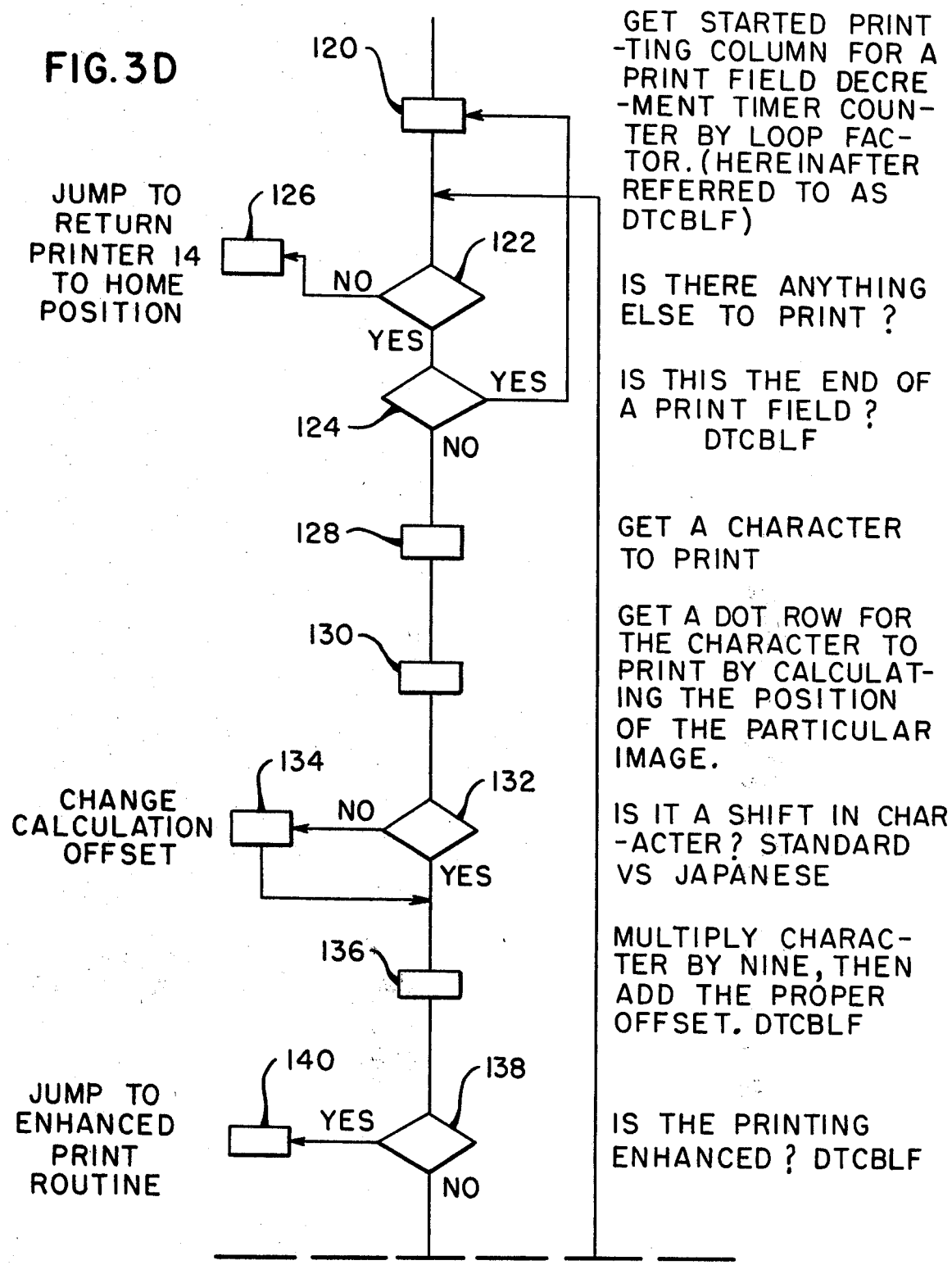

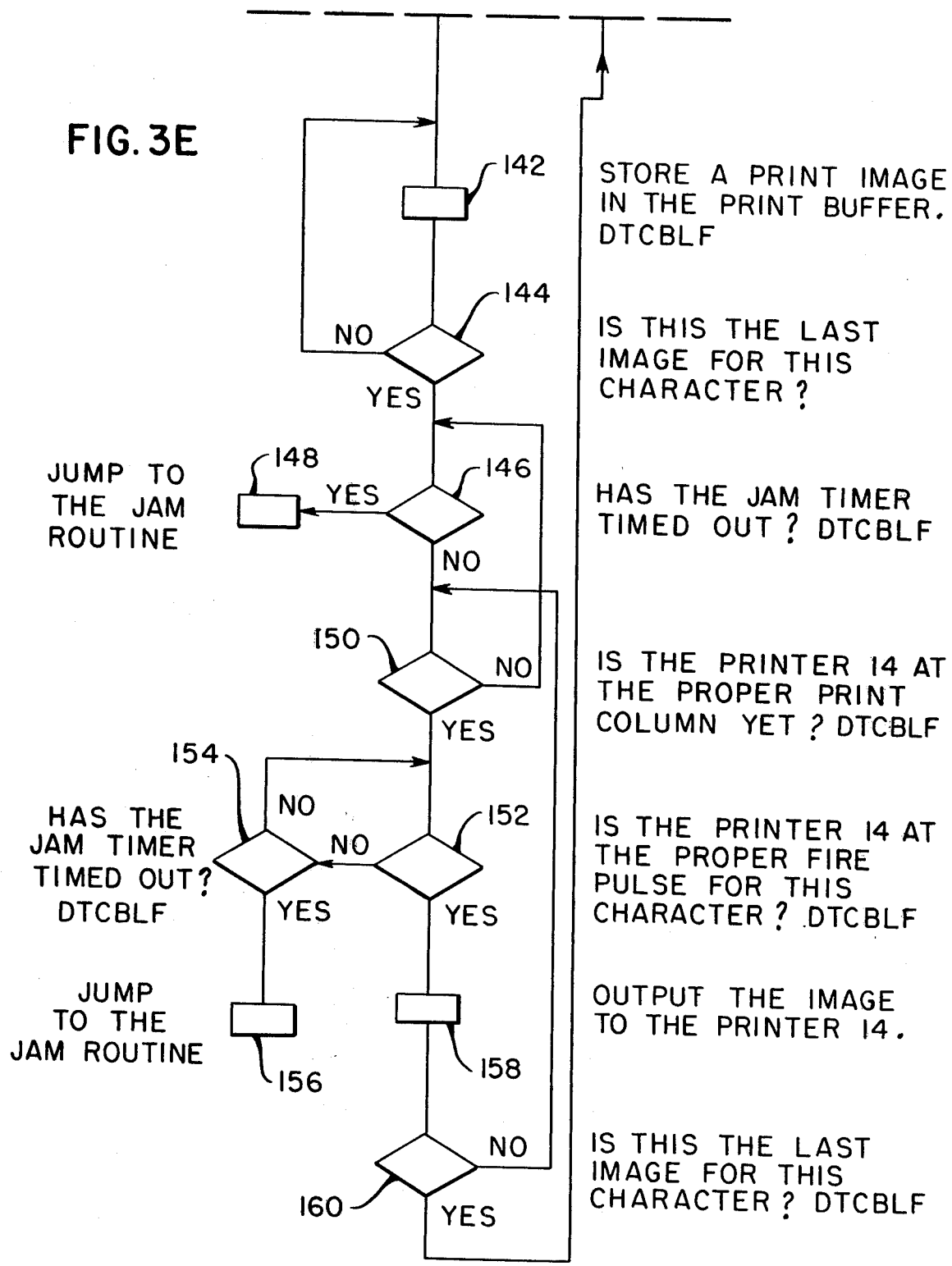

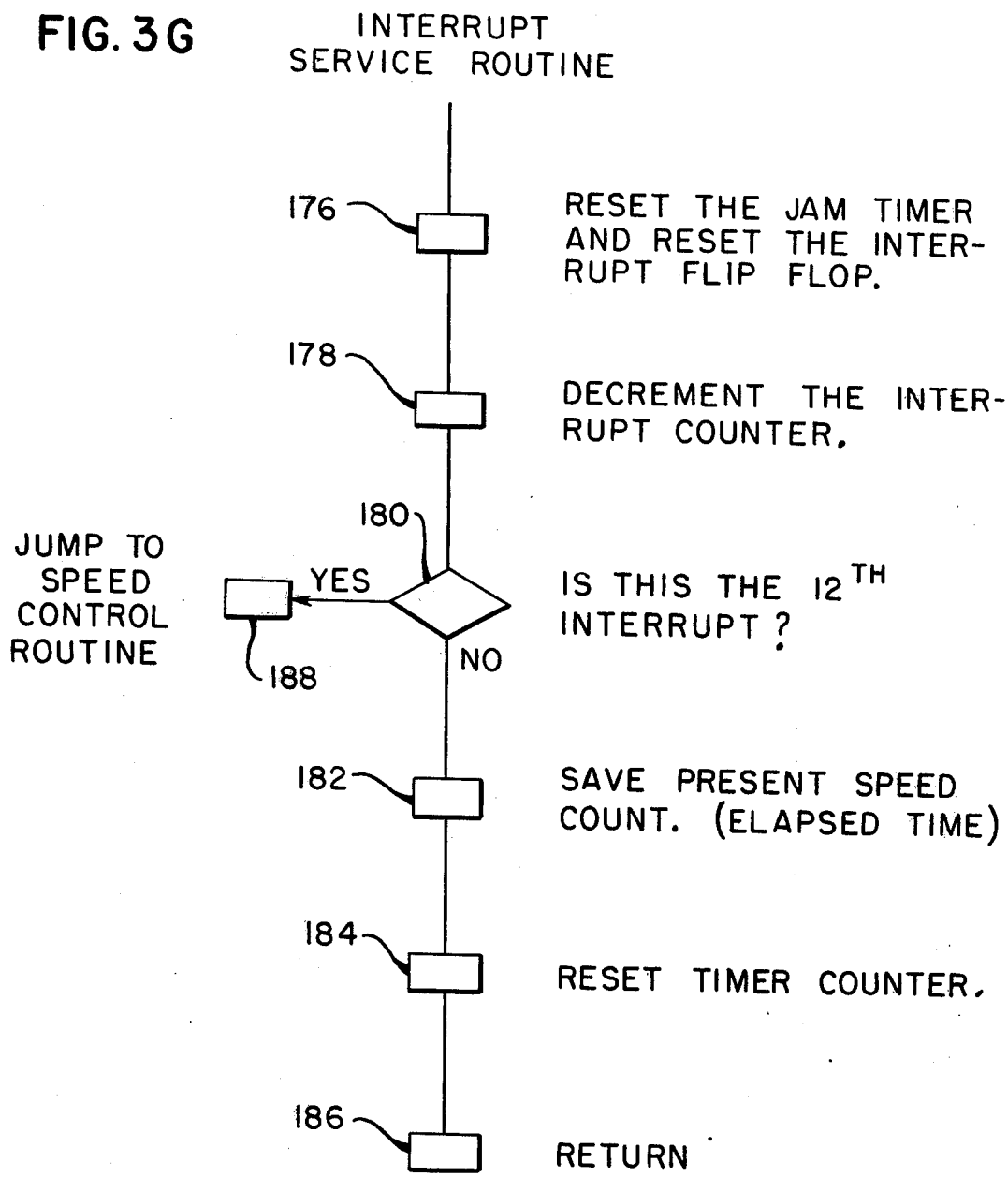

FIG. 4A

INTERRUPT SERVICE ROUTINE

| MEMORY LOCATION | ACTUAL INSTRUCTION 8080 | | INSTRUCTION SOURCE CODE | OPERAND (SOURCE) | COMMENTS |
|---|---|---|---|---|---|
| 02FB | F5 | INT8: | PUSH | PSW | ;SAVE REGISTERS |
| 02FC | 3EFF | | MVI | A,377Q | ;RESET/CLEAR INTERRUPT |
| 02FE | D305 | | OUT | 5 | |
| 0300 | 321D80 | | STA | JAMC | ;RESET JAM TIMER |
| 0303 | 3EDF | | MVI | A,337Q | ;RE-ENABLE HARDWARE INTERRUPT |
| 0305 | D305 | | OUT | 5 | |
| 0307 | 0D | | DCR | C | ;IS IT A FULL CHARACTER YET |
| 0308 | C21B03 | | JNZ | INT9 | ;NO-JUMP |
| 030B | DB08 | | IN | 8 | ;IS HEAD OUT OF HOME |
| 030D | E620 | | ANI | 40Q | |
| 030F | C40705 | | CNZ | SPDCR | ;YES-CONTROL THE SPEED |
| 0312 | 05 | | DCR | B | |
| 0313 | 0E0C | | MVI | C,12 | ;RESET THE CHARACTER PULSE COUNTER |
| 0315 | 3A3380 | | LDA | SPED | |
| 0318 | 323080 | | STA | FIRST | |
| 031B | 3E7F | INT9: | MVI | A,177Q | ;RESET THE SPEED TIMER |
| 031D | 323380 | | STA | SPED | |
| 0320 | F1 | | POP | PSW | |
| 0321 | FB | | EI | | |
| 0322 | C9 | | RET | | |

RETURN CARRIAGE MEANS 12 HOME

| | | | | | |
|---|---|---|---|---|---|
| 03A6 | 3E28 | HOME: | MVI | A,50Q | ;REVERSE NOMINAL SPEED |
| 03A8 | 323180 | | STA | PCO | |
| 03AB | D308 | | OUT | 8 | |
| 03AD | 3E7E | | MVI | A,176Q | ;REVERSE NOMINAL |
| 03AF | 323280 | | STA | NOM | |
| 03B2 | 7B | | MOV | A,E | |
| 03B3 | E69F | | ANI | 237Q | ;TURN OFF MOT 40μ SEC |
| 03B5 | 2F | | CMA | | |
| 03B6 | D309 | | OUT | 9 | |
| 03B8 | E3 | | XTHL | | |
| 03B9 | E3 | | XTHL | | |
| 03BA | 2F | | CMA | | |
| 03BB | F620 | | ORI | 40Q | ;PRINTER ON |
| 03BD | 5F | | MOV | E,A | |
| 03BE | 2F | | CMA | | |
| 03BF | D309 | | OUT | 9 | |
| 03C1 | 3E64 | | MVI | A,100 | |
| 03C3 | CD5109 | | CALL | WAIT | |
| 03C6 | DB08 | | IN | 8 | |

FIG. 4B

RETURN CARRIAGE MEANS 12 HOME (Cont'd.)

| MEMORY LOCATION | ACTUAL INSTRUCTION 8080 | | INSTRUCTION SOURCE CODE | OPERAND (SOURCE) | COMMENTS |
|---|---|---|---|---|---|
| 03C8 | E620 | | ANI | 40Q | ;IS HEAD HOME |
| 03CA | CAD703 | | JZ | HOME1 | ;YES |
| 03CD | CD4C1F | | CALL | JAMT | ;IS JAM TIMER DONE |
| 03D0 | C2C603 | | JNZ | $-10 | ;NO,JMP |
| 03D3 | F1 | | POP | PSW | |
| 03D4 | C35003 | | JMP | QUITA | |
| 03D7 | 7B | HOME1: | MOV | A,E | ;HEAD FORWARD |
| 03D8 | E6D7 | | ANI | 327Q | ;TURN OFF MOT 40 $\mu$ SEC |
| 03DA | 2F | | CMA | | |
| 03DB | D309 | | OUT | 9 | |
| 03DD | E3 | | XTHL | | |
| 03DE | E3 | | XTHL | | |
| 03DF | F3 | | DI | | |
| 03E0 | 3EFF | | MVI | A,377Q | ;DISABLE HARDWARE PRT INTERRUPT |
| 03E2 | D305 | | OUT | 5 | |
| 03E4 | 7B | | MOV | A,E | |
| 03E5 | F660 | | ORI | 140Q | ;PULSE HEAD FWD |
| 03E7 | 2F | | CMA | | |
| 03E8 | D309 | | OUT | 9 | |
| 03EA | DB00 | | IN | 0 | ;INPUT SP FOR FWD HEAD PULSE |
| 03EC | E61F | | ANI | 037Q | |
| 03EE | CD5109 | | CALL | WAIT | |
| 03F1 | 7B | | MOV | A,E | |
| 03F2 | E6D7 | | ANI | 327Q | ;TURN MOT OFF |
| 03F4 | 5F | | MOV | E,A | |
| 03F5 | 2F | | CMA | | |
| 03F6 | D309 | | OUT | 9 | |
| 03F8 | AF | | XRA | A | ;ZERO OUT PCO FOR SAFETY |
| 03F9 | 323180 | | STA | PCO | |
| 03FC | FB | | EI | | |
| 03FD | C9 | | RET | | |

FIG. 4C

NORMAL PROGRAM PROCESSING

| MEMORY LOCATION | ACTUAL INSTRUCTION 8080 | | INSTRUCTION SOURCE CODE | OPERAND (SOURCE) | COMMENTS |
|---|---|---|---|---|---|
| 03FE | F1 | PRINT: | POP | H | |
| 03FF | 222980 | | SHLD | RAW | ;SAVE RETURN ADDR OF PRINT ROUT |
| 0402 | EB | | XCHG | | |
| 0403 | 220480 | | SHLD | PORT9 | ;SAVE REGISTERS |
| 0406 | EB | | XCHG | | |
| 0407 | 79 | | MOV | A,C | ;SAVE REG C |
| 0408 | 321F80 | | STA | INFO | |
| 040B | CDFB02 | PRIN1: | CALL | INT8 | |
| 040E | 3E1D | | MVI | A,35Q | ;GET FWD NOMINAL SPEED |
| 0410 | 323180 | | STA | PCO | |
| 0413 | D308 | | OUT | 8 | |
| 0415 | 3E61 | | MVI | A,141Q | ;FORWARD NOMINAL |
| 0417 | 323280 | | STA | NOM | |
| 041A | 7B | | MOV | A,E | |
| 041B | F660 | | ORI | 140Q | ;START HEAD FWD |
| 041D | 5F | | MOV | E,A | |
| 041E | 2F | | CMA | | |
| 041F | D309 | | OUT | 9 | |
| 0421 | 21B80B | | LXI | H,3000 | ;SET HEAD HOME JAM TIMER |
| 0424 | 2B | | DCX | H | |
| 0425 | B4 | | ORA | H | |
| 0426 | B5 | | ORA | L | |
| 0427 | CA3F03 | | JZ | QUIT | |
| 042A | DB08 | | IN | 8 | |
| 042C | E620 | | ANI | 40Q | ;IS HEAD PAST 1ST PRINT SENSOR |
| 042E | CA2404 | | JZ | $-10 | ;JUMP IF NO |
| 0431 | 3E1F | | MVI | A,37Q | ;SET SECOND PCO |
| 0433 | 323180 | | STA | PCO | |
| 0436 | 065C | | MVI | B,92 | |
| 0438 | 0E0C | | MVI | C,12 | ;SET INTR COUNTERS |
| 043A | D1 | PST: | POP | D | |
| 043B | 7A | | MOV | A,D | |
| 043C | 321C80 | | STA | INRC | |
| 043F | FEFF | | CPI | 377Q | |
| 0441 | CAF304 | | JZ | ATEC | |
| 0444 | 7B | | MOV | A,E | |
| 0445 | 321180 | | STA | PTYPE | |
| 0448 | FB | | EI | | |
| 0449 | 3E09 | | MVI | A,9 | |
| 044B | CD4C1F | | CALL | JAMT | |
| 044E | 213A80 | | LXI | H,BUF1 | |
| 0451 | EB | | XCHG | | ;SET BUFFER AT D/E |

FIG. 4D

NORMAL PROGRAM PROCESSING (Cont'd.)

| MEMORY LOCATION | ACTUAL INSTRUCTION 8080 | | INSTRUCTION SOURCE CODE | OPERAND (SOURCE) | COMMENTS |
|---|---|---|---|---|---|
| 0452 | E1 | | POP | H | |
| 0453 | 7E | PST1: | MOV | A,M | |
| 0454 | E6E0 | | ANI | 340Q | ;ARE HO 3 BITS 0 FOR MARKER |
| 0456 | CA3A04 | | JZ | PST | ;JMP IF END MARKER IS ON |
| 0459 | 7E | | MOV | A,M | |
| 045A | E5 | | PUSH | H | |
| 045B | CDCD08 | | CALL | IMAGE | ;GET FIRE IMAGE |
| 045E | 7E | | MOV | A,M | |
| 045F | E67F | | ANI | 177Q | ;REMOVE 8TH BIT |
| 0461 | 12 | | STAX | D | ;STORE IMAGE IN BUFFER |
| 0462 | 3E07 | | MVI | A,7 | |
| 0464 | 7F | | MOV | A,A | |
| 0465 | CD4C1F | | CALL | JAMT | |
| 0468 | 3A1180 | | LDA | PTYPE | ;IS IT ENHANCED PRINT |
| 046B | B7 | | ORA | A | |
| 046C | CADF04 | | JZ | STD | ;JMP IF NOT |
| 046F | 13 | | INX | D | |
| 0470 | AF | | XRA | A | ;PLACE 0↑S BETWEEN IMAGES |
| 0471 | 12 | | STAX | D | |
| 0472 | 7E | | MOV | A,M | |
| 0473 | E67F | | ANI | 177Q | ;REMOVE 8TH BIT |
| 0475 | 23 | | INX | H | |
| 0476 | B6 | | ORA | M | |
| 0477 | 13 | | INX | D | |
| 0478 | 12 | | STAX | D | |
| 0479 | 13 | | INX | D | |
| 047A | AF | | XRA | A | |
| 047B | 12 | | STAX | D | |
| 047C | 7E | | MOV | A,M | |
| 047D | 23 | | INX | H | |
| 047E | B6 | | ORA | M | |
| 047F | 13 | | INX | D | |
| 0480 | 12 | | STAX | D | |
| 0481 | E680 | | ANI | 200Q | ;IS IT LAST IMAGE |
| 0483 | CA7904 | | JZ | $-10 | ;JMP IF NO |
| 0486 | 1A | | LDAX | D | |
| 0487 | E67F | | ANI | 177Q | |
| 0489 | 12 | | STAX | D | |
| 048A | 13 | | INX | D | |
| 048B | AF | | XRA | A | |
| 048C | 12 | | STAX | D | |
| 048D | 7E | | MOV | A,M | |
| 048E | 13 | | INX | D | |

FIG. 4E

NORMAL PROGRAM PROCESSING (Cont'd.)

| MEMORY LOCATION | ACTUAL INSTRUCTION 8080 | | INSTRUCTION SOURCE CODE | OPERAND (SOURCE) | COMMENTS |
|---|---|---|---|---|---|
| 048F | 12 | | STAX | D | |
| 0490 | 213A80 | PRIN2: | LXI | H,BUF1 | |
| 0493 | 3E06 | | MVI | A,6 | |
| 0495 | CD4C1F | | CALL | JAMT | ;IS JAM TIMER DONE |
| 0498 | CA3F03 | | JZ | QUIT | |
| 049B | 3A1C80 | | LDA | INRC | |
| 049E | 90 | | SUB | B | |
| 049F | FA9304 | | JM | PRIN2+3 | |
| 04A2 | 51 | PRIN3: | MOV | D,C | |
| 04A3 | 7A | | MOV | A,D | |
| 04A4 | B9 | | CMP | C | |
| 04A5 | C2B404 | | JNZ | $+15 | |
| 04A8 | 00 | | NOP | | |
| 04A9 | 3E06 | | MVI | A,6 | |
| 04AB | CD4C1F | | CALL | JAMT | |
| 04AE | C2A304 | | JNZ | PRIN3+1 | |
| 04B1 | C33F03 | | JMP | QUIT | |
| 04B4 | 7E | | MOV | A,M | ;GET IMAGE |
| 04B5 | 2F | | CMA | | |
| 04B6 | D301 | | OUT | 1 | ;FIRE THE IMAGE |
| 04B8 | 3A3380 | | LDA | SPED | ;DECREMENT THE SPEED COUNT |
| 04BB | D604 | | SUI | 4 | |
| 04BD | 323380 | | STA | SPED | |
| 04C0 | 7E | | MOV | A,M | |
| 04C1 | 23 | | INX | H | |
| 04C2 | E680 | | ANI | 200Q | ;IS IT LAST IMAGE |
| 04C4 | CAA204 | | JZ | PRIN3 | |
| 04C7 | 78 | | MOV | A,B | ;GET INTR CT AND STORE |
| 04C8 | 3D | | DCR | A | |
| 04C9 | 321C80 | | STA | INRC | |
| 04CC | E1 | | POP | H | |
| 04CD | 2B | | DCX | H | |
| 04CE | 113A80 | | LXI | D,BUF1 | |
| 04D1 | 00 | | NOP | | |
| 04D2 | 00 | | NOP | | |
| 04D3 | 00 | | NOP | | |
| 04D4 | 3A3380 | | LDA | SPED | |
| 04D7 | D604 | | SUI | 4 | |
| 04D9 | 323380 | | STA | SPED | |
| 04DC | C35304 | | JMP | PST1 | |
| 04DF | 23 | STD: | INX | H | ;STANDARD PRINT |
| 04E0 | 3A3380 | | LDA | SPED | ;DECREMENT THE SPEED COUNTER |

FIG. 4F

NORMAL PROGRAM PROCESSING (Cont'd.)

| MEMORY LOCATION | ACTUAL INSTRUCTION 8080 | | INSTRUCTION SOURCE CODE | OPERAND (SOURCE) | COMMENTS |
|---|---|---|---|---|---|
| 04E3 | D603 | | SUI | 3 | |
| 04E5 | 323380 | | STA | SPED | |
| 04E8 | 7E | | MOV | A,M | |
| 04E9 | 13 | | INX | D | |
| 04EA | 12 | | STAX | D | ;STORE IMAGE IN BUFFER |
| 04EB | E680 | | ANI | 200Q | |
| 04ED | CADF04 | | JZ | STD | |
| 04F0 | C39004 | | JMP | PRIN2 | |

SPEED CONTROL ROUTINE

| | | | | | |
|---|---|---|---|---|---|
| 0507 | D5 | SPDCR: | PUSH | D | |
| 0508 | 3A3080 | | LDA | FIRST | |
| 050B | 5F | | MOV | E,A | |
| 050C | 3A3380 | | LDA | SPED | |
| 050F | 57 | | MOV | D,A | ;SAVE PRESENT SPEED |
| 0510 | 93 | | SUB | E | ;SUB PREV FROM PRES SPEED |
| 0511 | FA3505 | | JM | SPDUP | ;ITS DECREASING IN SPEED |
| 0514 | CA2505 | | JZ | NOCHG | ;THERE IS NO CHANGE IN THE SPEED |
| 0517 | 3A3280 | SLODN: | LDA | NOM | ;ITS INCREASING IN SPEED |
| 051A | 92 | | SUB | D | ;SUB PRES FROM NOM |
| 051B | 3A3180 | | LDA | PCO | |
| 051E | F24005 | | JP | LEAV | ;IT DID NOT REACH NOM- LEAVE ALONE |
| 0521 | 3D | SLDN: | DCR | A | ;ITS FASTER THAN NOM- SLO DOWN |
| 0522 | C34005 | | JMP | LEAV | |
| 0525 | 3A3280 | NOCHG: | LDA | NOM | ;THERE IS NO SPEED CHANGE |
| 0528 | 92 | | SUB | D | ;SUB PRES FROM NOM |
| 0529 | 3A3180 | | LDA | PCO | |
| 052C | CA4005 | | JZ | LEAV | ;ITS NOM--LEAVE ALONE |
| 052F | FA2105 | | JM | SLDN | ;ITS FASTER THAN NOM- SLO DOWN |
| 0532 | F23F05 | | JP | SPDP | ;ITS SLOWER THAN NOM- SPEED UP |
| 0535 | 3A3280 | SPDUP: | LDA | NOM | ;SPEED IS DECREASING |
| 0538 | 92 | | SUB | D | ;SUB PRES FROM NOM |
| 0539 | 3A3180 | | LDA | PCO | |

FIG. 4G

SPEED CONTROL ROUTINE (Cont'd.)

| MEMORY LOCATION | ACTUAL INSTRUCTION 8080 | INSTRUCTION SOURCE CODE | | OPERAND (SOURCE) | COMMENTS |
|---|---|---|---|---|---|
| 053C | F24005 | | JP | LEAV | ;IT DID NOT REACH NOM-LEAVE ALONE |
| 053F | 3C | SPDP: | INR | A | ;ITS SLOWER THAN NOM-SPEED UP |
| 0540 | 323180 | LEAV: | STA | PCO | |
| 0543 | B7 | | ORA | A | |
| 0544 | FA3F03 | | JM | QUIT | ;JAM IF SPEED IS TOO SLOW |
| 0547 | D308 | | OUT | 8 | ;OUTPUT PRESENT SPEED COUNT |
| 0549 | D1 | | POP | D | |
| 054A | C9 | | RET | | |

PRINT ROUTINE

| | | | | | |
|---|---|---|---|---|---|
| 08CD | D5 | IMAGE: | PUSH | D | ;SAVE REGISTERS |
| 08CE | 21DC02 | | LXI | H,732 | ;SET 1/8 OFFSET FOR SHIFT IN |
| 08D1 | 5F | | MOV | E,A | |
| 08D2 | E680 | | ANI | 200Q | ;IS BIT 8 ON--SHIFT OUT |
| 08D4 | CADA08 | | JZ | $+6 | ;JUMP IF SHIFT IN |
| 08D7 | 211C05 | | LXI | H,1308 | ;SET 1/8 OFFSET FOR SHIFT OUT |
| 08DA | 1600 | | MVI | D,0 | |
| 08DC | 19 | | DAD | D | ;TIMES 1 |
| 08DD | 3A3380 | | LDA | SPED | |
| 08E0 | D607 | | SUI | 7 | |
| 08E2 | 323380 | | STA | SPED | |
| 08E5 | 29 | | DAD | H | ;TIMES 2 |
| 08E6 | 29 | | DAD | H | ;TIMES 4 |
| 08E7 | 29 | | DAD | H | ;TIMES 8 |
| 08E8 | 19 | | DAD | D | ;TIMES 9 |
| 08E9 | D1 | | POP | D | |
| 08EA | C9 | | RET | | |

FIG. 4H

DECREMENT TIMER COUNTER ROUTINE

| MEMORY LOCATION | ACTUAL INSTRUCTION 8080 | | INSTRUCTION SOURCE CODE | OPERAND (SOURCE) | COMMENTS |
|---|---|---|---|---|---|
| 1F4C | D5 | JAMT: | PUSH | D | |
| 1F4D | 57 | | MOV | D,A | |
| 1F4E | 3A3380 | | LDA | SPED | |
| 1F51 | 92 | | SUB | D | ;DECREMENT SPEED COUNTER |
| 1F52 | 323380 | | STA | SPED | |
| 1F55 | 3A1D80 | | LDA | JAMC | ;IS JAM TIMER DONE |
| 1F58 | 3D | | DCR | A | |
| 1F59 | 321D80 | | STA | JAMC | |
| 1F5C | D1 | | POP | D | |
| 1F5D | C9 | | RET | | |

SHUT DOWN ROUTINE

| | | | | | |
|---|---|---|---|---|---|
| 033F | F3 | QUIT: | DI | | |
| 0340 | 2A2480 | | LHLD | NEWWT | ;RESET MESSG BUFFER POINTER |
| 0343 | 222080 | | SHLD | NEWW | |
| 0346 | F1 | | POP | PSW | ;POP OFF REST OF MESSG |
| 0347 | FEFF | | CPI | 377Q | ;IS IT END YET |
| 0349 | C24603 | | JNZ | $-3 | ;NO-JUMP |
| 034C | AF | | XRA | A | |
| 034D | 321F80 | | STA | INFO | |
| 0350 | 3EFF | QUITA: | MVI | A,377Q | |
| 0352 | 320680 | | STA | JAMFL | ;SET JAM FLAG |
| 0355 | D309 | | OUT | 9 | |
| 0357 | 2A0480 | | LHLD | PORT9 | |
| 035A | EB | | XCHG | | |
| 035B | 210980 | | LXI | H,BLINK | ;BLINK RESET LIGHT |
| 035E | 7E | | MOV | A,M | |
| 035F | F640 | | ORI | 100Q | |
| 0361 | 77 | | MOV | M,A | |
| 0362 | CD5109 | | CALL | WAIT | |
| 0365 | DB06 | | IN | 6 | |
| 0367 | E640 | | ANI | 100Q | ;IS RESET PRESSED |
| 0369 | C28103 | | JNZ | QUIT1 | ;JMP YES |
| 036C | 3A0780 | | LDA | ACTIV | ;NO |
| 036F | 47 | | MOV | B,A | |
| 0370 | CD640A | | CALL | OPKEY | ;IS ACTIVE TELLER SW PRESSED |
| 0373 | CA5003 | | JZ | QUITA | ;NO, TELLER SW NOT PRESSED |
| 0376 | 3EF0 | QUITB: | MVI | A,360Q | ;NOTIFY OPERATOR OF INOP CONDITION |
| 0378 | D307 | | OUT | 7 | ;TURN OFF ALL LITES |
| 037A | 3EFB | | MVI | A,373Q | |
| 037C | CD3307 | | CALL | P5STA | ;SEND INOP STATUS |

4,147,967

APPARATUS AND METHOD FOR CONTROLLING THE VELOCITY OF A MOVEABLE MEMBER

BACKGROUND OF THE INVENTION

This application is related to the subject matter of copending U.S. application Ser. No. 813,191 which was filed on July 5, 1977 and copending U.S. application Ser. No. 828,563 which was filed on Aug. 29, 1977; both said copending applications have been assigned to the assignee of the present application.

This invention relates to an apparatus and method for accurately controlling the velocity of a moving member, like a print head carrier, for example, which moves along the platen of a printer, and for providing timing signals for printing uniformly spaced dots when using a wire matrix printer as the printing element, even with some variation in the velocity of the print head carrier.

Most systems of the prior art utilize a tachometer which is coupled to the drive shaft of the motor driving the print head carrier, and the tachometer is used to feed back an analog signal which is proportional to the speed of the motor. The analog signal is then compared with a reference signal in a comparator means which controls the operating speed of the motor by a variety of techniques disclosed in the prior art.

SUMMARY OF THE INVENTION

This invention relates to an apparatus and method of controlling the velocity of a moveable member such as a print head carrier relative to a desired nominal velocity. The apparatus includes means for producing successive signals for equal distances over which the moveable member is moved; means for providing groups of operational steps for performing operations in addition to controlling the velocity of said moveable member, whereby each group of operational steps has a time period associated therewith during which the associated group of operational steps is performed; means for counting the time periods as the associated groups of operational steps are completed between said successive signals to provide a first count which corresponds to the actual velocity of said moveable member; means for comparing the first count with a second count which represents the desired nominal velocity to determine whether the moveable member is moving faster or slower than the desired nominal velocity; and modulating means for controlling a deenergizing "off period" and an energizing "on period" to a motor which moves the moveable member so as to minimize "overshoot" and "undershoot" of the moveable member relative to the desired nominal velocity.

In a preferred form of the invention, a processor is used and the preferred method contemplates providing the groups of operational steps mentioned as operational loops (associated with the processor) with each operational loop having a loop factor or time period associated therewith, and with each operational loop having the same loop factor or a multiple thereof. Upon the completion of each operational loop, a record of the elapsed time period associated therewith is recorded on a counter which is used in conjunction with a timing strip (which provides the successive signals mentioned) to obtain the first count which corresponds to the actual velocity of the moveable member. The method also contemplates taking into consideration acceleration and deceleration characteristics of the moveable member in addition to determining just whether it is moving slower or faster than the desired nominal velocity so as to minimize "overshoot" and "undershoot" conditions relative to the desired nominal velocity.

When this invention is used in a wire matrix printer environment, for example, it can provide for printing uniformly spaced dots comprising a character even with some variation in the velocity of the moveable member or carriage supporting the wire matrix print head.

An added feature of this invention is that standard, medium-scale, integrated devices and standard processors can be used for minimum cost and maximum flexibility of design.

Still another feature of this invention is that it uses a single digital counter for generating recurrent pulses having controlled different on and off intervals.

These advantages and others will become more apparent from the following specification, claims and drawing.

BRIEF DESCRIPTION OF THE DRAWING

FIGS. 3A–3G show a flow chart for the speed control program; and

FIGS. 4A–4H show a detail program listing for the speed control program.

DETAILED DESCRIPTION OF THE INVENTION

Figure 1:
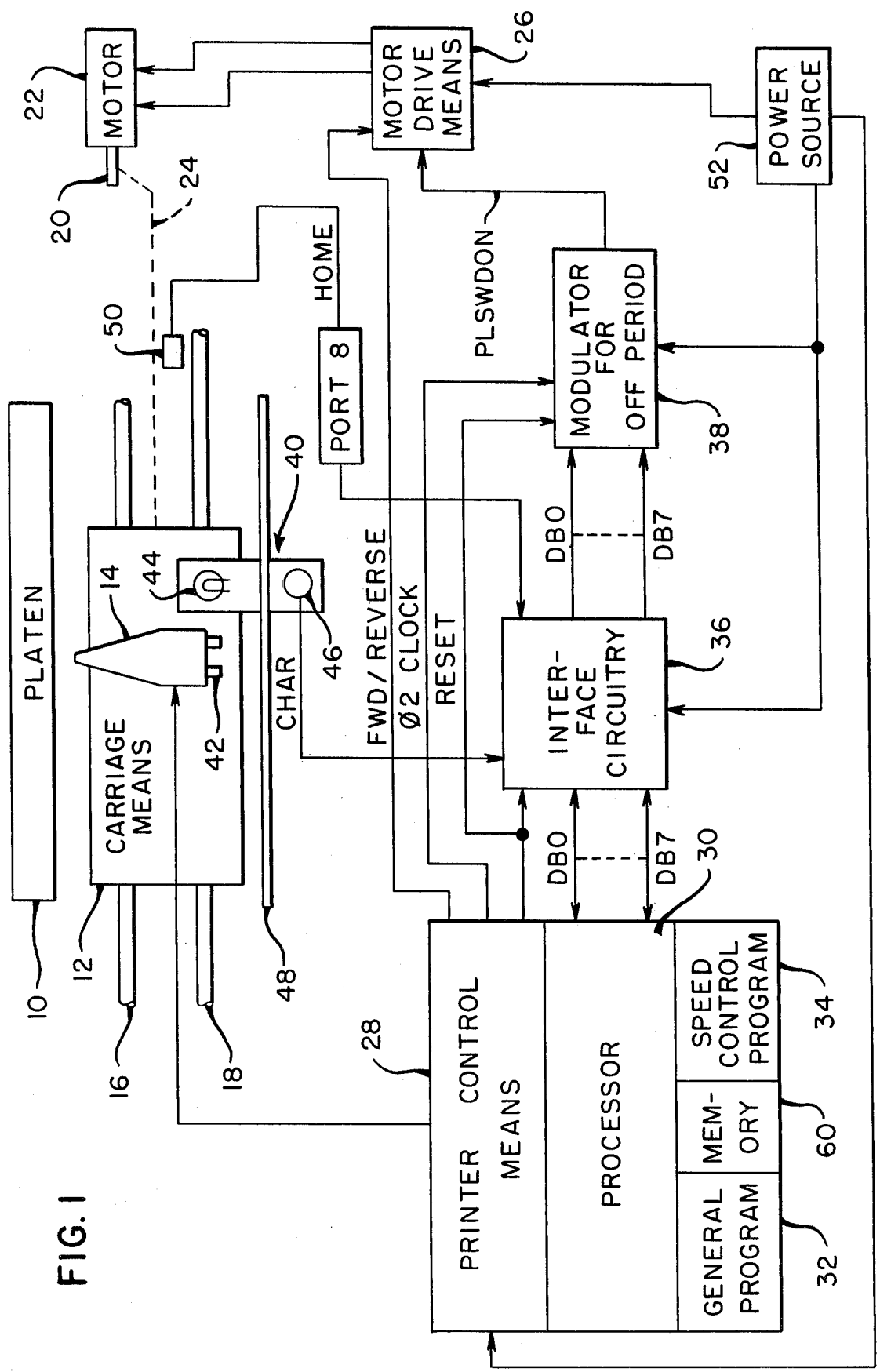
FIG. 1 is a general diagrammatic view of the apparatus of this invention as used in a typical embodiment such as a wire matrix printer, showing a carriage means having a wire matrix printer thereon, a motor which is operatively connected to the carriage means to drive it, a motor drive means for driving the motor, velocity sensing means located on the moveable member or carriage means, a printer control means for controlling a wire matrix printer located on the carriage means, including a processor, a speed control program, interface circuitry and a modulator for controlling an "energizing on" period and a deenergizing "off period" to the motor.

FIG. 1 is a general diagrammatic view of a preferred embodiment of the apparatus of this invention as used in a typical application such as a wire matrix printer. The printer may be conventional and includes a platen 10, a carriage means 12, and a wire matrix printer 14 mounted on the carriage means 12. The carriage means 12 is moveably supported on fixed guide rods 16 and 18 to enable the carriage means to be reciprocated relative to platen 10. The output shaft 20 of motor 22 is conventionally coupled to the carriage means 12 by suitable connecting means 24 to reciprocate it along the platen 10. Because the connecting means 24 may be conventional, such as a traversing lead screw or a belt and pulley system, it is shown only as a dashed line in FIG. 1. The motor 22 is preferably a conventional DC motor, and it is selectively energized by a conventional motor drive means shown only as a block 26. The printer control means 28 includes a processor 30 and a general program 32 for controlling the usual start up procedures and functions such as interfacing with associated peripherals and for performing the usual functions such as paper feeding, etc. associated with a printing operation. Additionally, the processor 30, the speed control program 34, the interface circuitry 36, the modulator 38, and the velocity sensing means 40 combine to form the apparatus of this invention for controlling the speed of the carriage means 12 (moveable member) and for controlling the firing of the individual solenoids 42 in the wire matrix printer 14.

The processor 30 receives the output from the velocity sensing means 40, and uses this information in conjunction with the speed control program 34 to control the speed of motor 22 so as to maintain the velocity of the carriage means 12 constant relative to a nominal desired velocity. The velocity sensing means 40 includes a light source 44 and a detector such as a photoelectric cell 46 which are positioned on opposed sides of a timing strip 48. The timing strip 48 is stationary relative to the velocity sensing means 40 which is secured to the carriage means 12 to travel therewith. The timing strip 48 is conventional and is made of opaque material and has a plurality of equally spaced slots therein which enable light from the light source 44 to pass therethrough to the photoelectric cell 46, and the time period between successive pulses from photoelectric cell 46 gives an indication of the actual velocity of the carriage means 12 as it is traversed along the platen 10. In the embodiment described, the wire matrix printer 14 prints in a 7 by 12 format with the characters printed being 7 dot positions high and 9 dot positions or vertical columns wide, with 3 dot positions being utilized to provide the necessary spacing between adjacent characters. The spacing between the slots in the timing strip 48 is such as to provide a pulse from the photoelectric cell 46 for each dot position or vertical column mentioned. The home sensor 50 is a conventional sensor such as a light switch or mechanical switch which produces a signal when the carriage means 12 leaves the home position which is an extreme right position as viewed in FIG. 1. The wire matrix printer 14 described prints from right to left although this invention may obviously be applied to other printers or moveable members. A conventional power source 52 is utilized to provide the necessary voltage levels to the motor drive means 26, the modulator 38, the interface circuitry 36 and the printer control means 28.

Figure 2A:
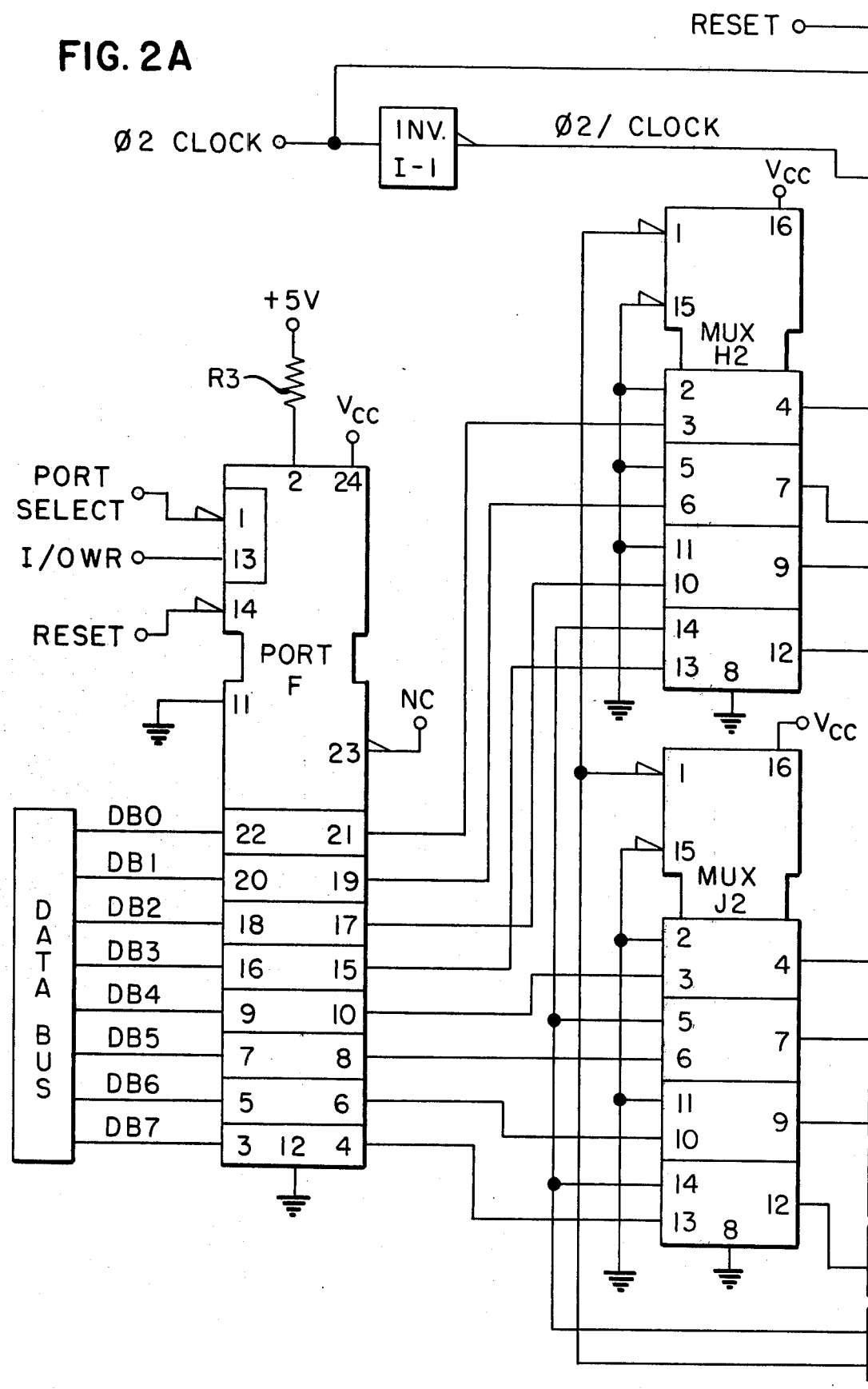
FIGS. 2A and 2B taken together comprise the modulator shown in FIG. 1.
Figure 2B:
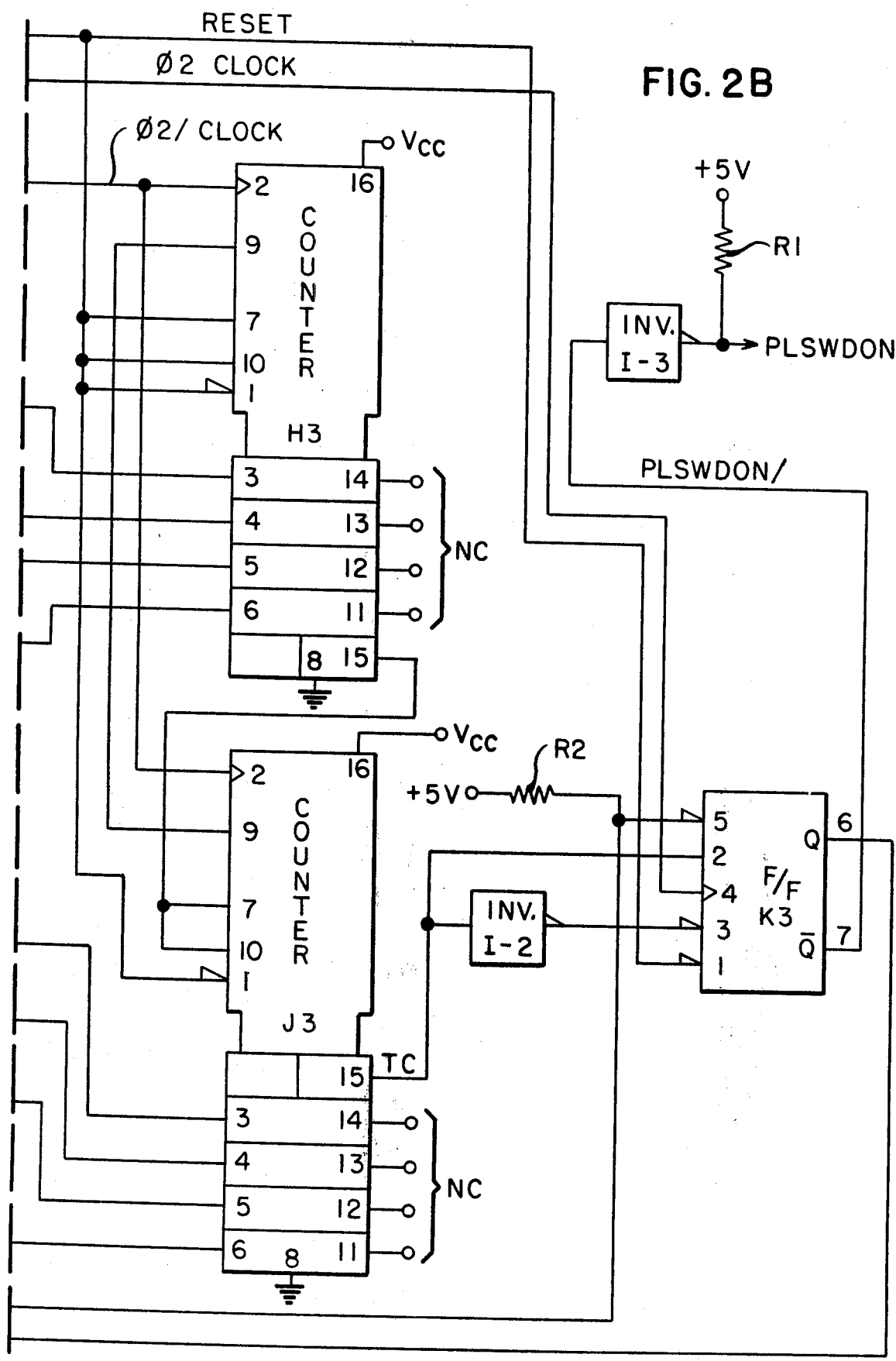

FIGS. 2A and 2B comprise a schematic diagram of the modulator 38 shown in FIG. 1. The velocity of the carriage means 12 is controlled by alternately energizing the motor 22 during a so-called "on" period and de-energizing the motor 22 during a so-called "off" period. The output of the modulator 38 (FIG. 1) includes a pulse marked PLSWDON which is fed into the motor drive means 26 (FIG. 1) for conventionally controlling the energization of motor 22. When pulse PLSWDON is a binary 1 or active high for example, the motor 22 is conventionally energized via the motor drive means 26, and when the pulse PLSWDON is a binary 0 or active low, the motor 22 is de-energized. The pulse PLSWDON is derived from the control means or flip-flop K3 shown in FIG. 2B. In general, the on period for energizing motor 22 and the off period for deenergizing it are designed so that the on period will represent about 25 to 33 percent of the total duty cycle time for the motor 22.

Assume for the moment, that the motor 22 is at rest and it is desired to move the carriage means 12 in a forward direction (to the left as viewed in FIG. 1) to the desired nominal velocity so as to begin printing. To initiate the control, a RESET pulse coming from the printer control means 28 of FIG. 1, is used to reset the counter means H3-J3 (comprised of two conventional four bit binary counters H3 and J3 which are wired together to form the eight bit binary counter means H3-J3) and to reset the flip-flop K3 shown in FIG. 2B, and a FORWARD (FWD) pulse is used to condition the motor drive means 26 to drive the motor 22 in a forward direction. An up-ramp routine under the control of the speed control program 34 of FIG. 1 is used to provide a gradual starting up to approximately the desired nominal velocity. When the flip-flop K3 is reset, its Q output conditions the multiplexer means H2-J2 to gate a fixed 8 bit binary count (which is hardwired on one set of input terminals of the multiplexer means H2-J2 and called the "on" count) to the 8 bit binary counter means H3-J3 to initiate the start of the energizing "on" period to the motor 22. The "on" count is preset upon the counter means H3-J3, and the $\phi 2/$ clock derived from the printer control means 28 is used to increment the counter means from the preset "on" count thereon to the terminal count (TC) thereof. The terminal count signal from counter means H3-J3 is then fed into the flip-flop K3 causing it to change state to thereby terminate the "on" period and initiate the start of the de-energizing "off" period by enabling the multiplexer means H2-J2 to accept an "off" count from the processor 30. The processor 30, via its speed control program 34, outputs an eight bit binary first count or "off" count over the data bus DB0-DB7 to the port F in FIG. 2A, and this first count is gated into the counter means H3-J3 by the multiplexer means H2-J2. This first count or "off" count is preset upon the counter means H3-J3, and the counter means H3-J3 is then incremented by the $\phi 2/$ clock until the terminal count thereof is reached, and this terminal count causes the flip-flop K3 to change state, thereby terminating the "off" period, and initiating the start of another energizing "on" period. The two states of the flip-flop K3 are used to alternately energize and de-energize the motor through the use of the PLSWDON pulse (derived from the flip-flop K3) and the motor drive means 26.

It should be noted at this time, that if the motor 22 is starting from rest, the velocity sensing means 40 will not produce any signal until such time as motor 22 causes the carriage means 12 and sensing means 40 thereon to move past one of the timing slots on the timing strip 48 shown in FIG. 1. The predetermined binary count which was hardwired on the multiplexer means H2-J2 and the first count from the processor 30 are alternately multiplexed into the counter means H3-J3 for several such cycles until the carriage means 12 moves sufficiently far to enable the sensing means 40 to coact with the timing strip 48 to produce a first pulse which is called CHAR or an interrupt signal and is shown on FIG. 1. An out-of-home position signal from the home sensor 50 is also fed to the processor 30 which uses it to multiplex a second "off" period count into the counter means H3-J3 thereby completing the up-ramp routine; this aspect will be described in more detail in relation to the flow charts shown in FIGS. 3A-3G which show the method for controlling the speed of the carriage means 12 and the wire matrix printer 14 thereon.

In describing the preferred embodiment of this invention, an 8080 Intel microprocessor was used for the processor 30, although, naturally other processors may be used. The various instructions and codes used for the detail program listing shown in FIGS. 4A-4H, which correspond to the flow charts shown in FIGS. 3A-3G, are the standard ones defined in the "Intel 8080 Microcomputer Systems Manual" which was published in September, 1975, for example. Page 4-15 of this manual provides a summary of the processor instructions, and pages 4-1 through 4-14 provide detailed explanations of the 8080 instruction set.

Step 54 in FIG. 3A illustrates various initialization and housekeeping functions associated with the general program 32. When the general program 32 indicates that a printing function is required, the general program 32 transfers the control to the speed control program 34 at the step 56 marked "start" in FIG. 3A. At step 58 the interrupt counter and the timer counter are initialized. The interrupt counter may, for example, be the "C" register associated with the processor 30, and the timer counter may be a memory location in a RAM portion of memory 60 which is identified by an eight bit memory word called "SPED"; however, it is convenient to think of this memory location as a counter as that is the function which is performed therewith. The interrupt counter has the value of 12 placed thereon during the initialization procedure, as the speed of the motor 22 is adjusted for every 12 CHAR pulses coming from the velocity sensing means 40. It should be recalled that the specific printer 14 selected, prints a character in a 7 × 12 matrix, with 12 representing the width of a character including 3 "vertical columns" or CHAR pulses for spacing between characters, and with 9 "vertical columns" or CHAR pulses representing the character itself.

The timer counter is used to store a count which reflects the actual velocity of the carriage means 12 and the printer 14 thereon. In general, the operational loops mentioned earlier herein for controlling operations in addition to controlling the velocity of the carriage means 12 are shown in FIGS. 3D and 3E. These operational loops have the same loop factor (time period) or multiples thereof associated therewith. Each time one of these operational loops is completed, the timer counter (which is the eight bit binary word SPED which has the binary value of 127 initially loaded in the memory 60) is decremented by the associated loop factor. The eighth or highest order bit of the 8 bit word SPED is used to indicate a negative balance should the timer counter be decremented by more than 127; this would indicate that something is wrong (such as carriage 12 not moving) and the system would be shut down. Because the distance between adjacent transparent slots on the timing strip 48 is the same, the elapsed time (as measured by decrementing the loop factors for associated completed operational loops) between successive CHAR signals coming from the velocity sensing means 40, gives an indication of the actual velocity of the carriage means 14.

In step 58, a duty cycle control word representing an eight bit binary count is placed in a memory location in conventional memory 60, including both ROM and RAM units. This duty cycle control word, hereinafter called PCO count for Program Count Output, represents a binary count which continually gets modified, as necessary, and is sent to the modulator 38 to vary the de-energizing off period for the motor 22 as previously described. The first PCO count coming from step 58 of FIG. 3A is the first "off" count mentioned in the general description given in relation to the modulator 38 shown in FIGS. 2A and 2B. In step 58, the motor drive means 26 is also conditioned to drive the motor forward, and the reset pulse conditions the flip-flop K3 in FIG. 2B to accept the "on" count (hardwired on multiplexer means H2-J2) to initiate the start of the first energizing on period to motor 22.

In step 62 in FIG. 3A, the processor 30 turns on the motor 22, and the PCO count which was stored in memory 60 is output over the data bus DB0-DB7 to the port F (FIG. 2A) and latched therein via the conventional interface circuitry 36. The "on" count (hardwired on the multiplex means H2-J2) is loaded onto the counter means H3-J3, and the $\phi 2/$ clock is used to increment the counter means H3-J3 from the "on" count preset thereupon to the terminal count thereof. When the terminal count (TC) is reached, a (TC) output from pin 15 of counter J3 causes the flip-flop K3 to change state, thereby terminating the energizing on period and commencing the start of the de-energizing off period by conditioning the multiplexer means H2-J2 to load the counter means H3-J3 with the PCO count which is latched in port F. The $\phi 2/$ clock is again used to increment the counter means H3-J3 from the PCO count set thereupon to the terminal count thereof. When the terminal count (TC) is reached, a terminal count (TC) output from pin 15 of counter J3 causes the output of flip-flop K3 to change state, thereby terminating the de-energizing off period and commencing the start of the energizing on period by conditioning the multiplexer means H2-J2 to load the counter means H3-J3 with the binary on count which is hardwired onto one set of two sets of inputs of the multiplexer means H2-J2. The $\phi 2/$ clock is then used to increment the counter means H3-J3 from the on count preset thereupon to the terminal count thereof. The terminal count from pin 15 of counter J3 causes the flip-flop K3 to again change states, thereby terminating the energizing on period and commencing the start of the de-energizing on period as previously described. Several such cycles of alternately energizing and de-energizing the motor 22 are necessary before the carriage means 12 leaves the home position to enable the timing strip 48 to produce its first CHAR or interrupt signal.

At step 64 the processor 30 asks the question "Has an interrupt or CHAR signal been received?" The most likely answer at this time is "No", as the carriage means 12 probably has not left the home position as yet. From step 64, the processor 30 then proceeds to step 66 where the question "Is the interrupt counter equal to zero?" is asked. The most likely answer at this time is a "No", and consequently, the processor proceeds to step 68 where the question is asked, "Is the printer 14 (and carriage means 12) out of the home position yet?" The most likely answer at this time is a "No", and consequently, the processor 30 is returned to step 64. If the answer to step 64 is a "Yes", the interrupt counter is decremented by one in step 70. It should be recalled that the interrupt counter is initially preset with a binary count of 12 thereon in step 58. The count of 12 is selected in the embodiment described because 12 CHAR or interrupt pulses comprise one character being printed, and the speed of the carriage means 12 is adjusted for each character printed. At step 70, the present speed count is stored for use in speed and acceleration characteristics of the carriage means 12; this aspect will be described later herein. From step 70, the program 34 proceeds to step 66. If the interrupt counter is a zero at step 66, it is reset to 12 in step 72. This is to insure that none of the interrupts is missed. From step 72, the program 34 proceeds to step 68. If the carriage means 12 still has not left the home position at step 68, the program 34 returns to step 64 to repeat the process described. If at step 68, the carriage means 12 has left the home position as evidenced by a signal from the home sensor 50 (FIG. 1)

coming over port 8, the program 34 proceeds to step 74 where the question is asked, "Is this the first time through this loop?" If the answer to step 74 is "Yes", a second duty cycle control word (PCO count) is output to the modulator 38 via step 76 to control the de-energizing off period of motor 22 as previously described. The first PCO count which was utilized in step 58 may be considered an "up-ramp" routine to get the motor 22 started, and the second PCO count from step 76 enables the motor 22 to move the carriage means 12 at a velocity which is near the desired nominal velocity.

From step 76, the program 34 proceeds to step 78 where the question, "Is this the 12th interrupt?" is asked. If the answer is "No", the program 34 shifts to normal program processing indicated by step 80 in FIG. 3A. Step 80 represents the expanded flow of operations and operational loops shown on FIGS. 3D and 3E. The various operations shown in FIGS. 3D and 3E represent operations associated with the usual printing functions associated with the printer 14; this aspect will be described in detail hereinafter. At this point, it should be stated that while the program 34 may be in the normal processing phase as represented by step 80 in FIG. 3A, as soon as an interrupt or CHAR signal is received, the interrupt service routine (shown in FIG. 3G and also identified as INT 8 and shown in memory location 02FB on FIG. 4A of the detail program listing) is initiated. This particular interrupt INT 8 is hardwired into the program 34 so that whenever an interrupt or CHAR signal is received, the normal processing is interrupted and the speed control routine shown on FIGS. 3A-3C is initiated. The routine shown in FIG. 3G is a slightly expanded flow chart of a portion of the flow chart shown in FIG. 3A as it pertains to step 78 in FIG. 3A.

At step 78 in FIG. 3A, if the interrupt is the 12th interrupt or CHAR signal, as evidenced by the interrupt counter being decremented from 12 to zero, the program 34 proceeds to step 82 in FIG. 3B, where the question "Is the present speed above the nominal speed?" is asked. The nominal speed at which it is desired to move the carriage means 12 is represented by an eight bit binary count which is placed in a memory location in memory 60. The nominal speed also represents the count which could occur on the timer counter between two successive CHAR or interrupt signals when the actual speed of the carriage means 12 is moving at the desired nominal velocity. The actual velocity of the carriage means 12 or its present speed is represented by the actual count which occurs on the timer counter between two successive CHAR or interrupt pulses from the velocity sensing means 40. Thus, while the velocity of the carriage means 12 is adjusted (if necessary) once for every 12 CHAR pulses, the actual or present speed of the carriage means 12 is determined between every 2 successive CHAR pulses. With this in mind, if the present speed is above the nominal speed, the program 34 proceeds to step 84 in FIG. 3B.

At step 84 in FIG. 3B, the question, "Is the slope of the speed increasing", is asked. In this regard, a feature of this invention is that the method of controlling the speed of the carriage means 12 includes not only a general query related to whether the carriage means 12 is moving faster or slower than a desired velocity, but also includes an examination of the "acceleration" or "deceleration" characteristics of the carriage means 12 in preparation to deciding whether to slow it down, speed it up, or leave its speed unchanged. For example, if the present speed of the carriage means 12 is above the desired nominal speed, and the acceleration characteristics indicate that the present speed of the carriage means 12 for the interval under examination is also increasing compared to an immediately prior interval, then the speed of the motor 22 moving the carriage means 12 should be slowed down; however, if the acceleration characteristics in the example under consideration indicate that the present speed is decreasing compared to an immediately prior interval, then the speed of the motor 22 should not be changed as the carriage means 12 is already starting to slow down even though its present velocity is above the desired nominal velocity. This type of control minimizes the tendency of the carriage means 12 to "overshoot" and "undershoot" its desired nominal velocity when compared to prior art speed control system which do not take acceleration characteristics into consideration.

With regard to step 84 in FIG. 3B, the "slope" of the speed of the carriage means 12 is determined by comparing the present speed count with the present speed count from an immediately prior interval which was stored in memory 60 in step 70 in FIG. 3A. It should be recalled that the present speed count is obtained by loading the timer counter (the eight bit memory word SPED with a binary count of 127) and decrementing it by the associated loop factor when each of the loops for the normal processing represented by step 80 in FIG. 3A is completed. Because the loop factors represent predetermined time periods, the count which appears between successive interrupt or CHAR signals gives an indication of the actual velocity or present speed of the carriage means 12. The following is a chart which shows various counts on the timer counter when the carriage means 12 is moving at various speeds:

| Counts On Timer Counter | | |
|---|---|---|
| At Desired Nominal Speed | At Faster Than Nominal Speed | At Slower Than Nominal Speed |
| 127 | 127 | 127 |
| − 30 loop factors | − 29 loop factors | − 31 loop factors |
| (97) | (98) | (96) |

From the above chart, it is apparent that the present speed counts (in parentheses) increase and decrease as the carriage means 12 moves faster and slower, respectively, than the desired nominal speed.

Continuing with step 84 of FIG. 3B, if the slope of the speed of the carriage means 12 is increasing (meaning that the present speed count is greater than the present speed count of the immediately prior interval between successive CHAR pulses), then the duty cycle control word (PCO count) is decremented by one in step 86 and stored in preparation to being output in step 88 to the modulator 38 to thereby lengthen the de-energizing off period to the motor 22 and thereby reduce the speed of the carriage means 12. If in step 84 the slope of the speed were not increasing, then the program 34 shifts to step 92 at which no change is made to the duty cycle control word. The unchanged duty cycle control word from the last speed adjustment is output in step 88. In step 92, the slope word is reset (meaning that the preset speed count is stored in a portion of memory 60 as was done in step 70); the interrupt counter is reset; and the timer counter is also reset (loaded again with a binary count of 127). It should be noted that at every interrupt or CHAR signal, the associated preset speed count is stored in memory for use in the slope determination of step 84. From step 92, the program 34 shifts to step 64 of FIG. 3A to perform the minor "housekeeping" functions shown thereafter, and eventually shifts to step 80 which represents normal processing such as gathering data to be printed, formatting it, and firing the associated solenoids 42 of the wire matrix printer 14. Thus, it can be seen that while the processor 30 is used for the normal functions associated with printing, it is momentarily interrupted from performing these functions to perform the speed control function being described. The normal printing functions associated with the processor 30 are arranged in operational loops having definite loop factors or time periods which are used for obtaining the actual speed of the carriage means 12; this feature will be described in more detail hereinafter.

Returning to step 82 of FIG. 3B, if the present actual speed of the carriage means 12 is not above the desired nominal speed, the program 34 shifts to loop B shown in FIG. 3C. At step 94, the question, "Is the present speed below the nominal speed?" is asked. At this point the present speed could be equal to or lower than the desired nominal speed. If the answer to step 94 is "Yes", the program 34 shifts to step 96 where the question "Is the slope of the speed decreasing?" is asked. If the slope is decreasing (as determined by comparing the present speed count with the present speed count for the immediately prior interval between two successive CHAR signals) then the duty cycle control word or PCO count is increased by one in step 98 and stored in a memory location in memory 60. In step 100 the duty cycle control word is output to the modulator 38 to decrease the width of the deenergizing off period of the motor 22 to thereby speed up the carriage means 12. From step 100, the program 34 jumps (in step 102) to A of FIG. 3B to complete step 92 which has already been described. If the slope of the present speed count is not decreasing in step 96 of FIG. 3C, the program 34 shifts to step 104 at which no change is made to the duty cycle control word which is stored in memory and the program 34 then continues at step 100 already described.

If in step 94 of FIG. 3C, the present speed count is not below the nominal speed count, then the program 34 jumps to location "C" on FIG. 3C where at step 106 it is deduced that the present speed count must be equal to the nominal speed count, i.e., if from "B" of FIG. 3B the present speed count is not above the nominal speed count, and from "C" of FIG. 3C at step 94 the present speed count is not below the nominal speed count, then the present speed count must be equal to the nominal speed count. At step 108, the question is asked, "Is there any slope?" and if there is no slope, the program 34 shifts to steps 104 and then 100 already described. If there is a slope, then the question "Is the slope increasing?" is evaluated in step 110. If the answer to step 110 is "No", (indicating that the slope is decreasing) the duty cycle control word is increased by one in step 112 and stored in memory and then output in step 116. Because the slope was not increasing (as determined by comparing the present speed count with the immediately prior speed count stored in memory) in step 110, incrementing the duty cycle control word in step 112 has the effect of decreasing the de-energizing off period of motor 22 which in turn increases the velocity of the carriage means 12. If the answer to step 110 is a "Yes", the program 34 then proceeds to step 114 at which step the duty cycle control word which was stored in memory (from the last speed adjustment) is decremented by one and stored for use in the next speed adjustment routine. The revised duty cycle control word derived from step 114 is then output in step 116 to the modulator 38 as previously described, and the program 34 then jumps from step 118 to "A" of FIG. 3.

FIGS. 3A, 3B, and 3C describe substantially the speed control program 34 for controlling the speed of the carriage means 12, while FIGS. 3D and 3E show typical printing operations associated with the wire matrix printer 14; however it is in FIGS. 3D and 3E that the various operational loops and loop factors mentioned earlier herein are shown. It should be recalled that these operational loops were designed to have the same time period (loop factor) or multiples thereof. For example, a loop factor of 12 indicates that the particular loop under consideration takes 2 times as long to complete as an operational loop having a loop factor of 6, with the loop factor of 6 being the shortest time to complete an operational loop. Each time one of the operational loops is completed, the timer counter (memory word SPED in memory 60) is decremented by the associated loop factor, and therefore, the count which is decremented from the timer counter is actually a measure of the elapsed time which occurs between successive interrupt or CHAR signals derived from the timing strip 48.

An example of the various counts used in the embodiment of the invention shown in FIG. 1 will make the method of operation of this invention more readily understood. As stated earlier herein, the energizing on period for the motor 22 is fixed and the de-energizing off period of the motor 22 is modulated by the modulator 38 to speed up or slow down the carriage means 12 so as to maintain its speed at the desired nominal velocity.

The energizing on period for the motor 22 is fixed by hard wiring an 8 bit binary count of 168 (FIG. 2A) on one set of the input terminals to the multiplexer means H2-J2, with the multiplexer H2 handling the 4 bit low byte of data and the multiplexer J2 handling the associated 4 bit, high byte of data. When the flip-flop K3 is reset, the binary count of 168 is fed into the counter means H3-J3 and after 87 $\phi 2/$ clock pulses, the terminal count of the counter means H3-J3 coming from terminal 15 of counter J3 causes the flip-flop K3 to change state, thereby terminating the energizing on period and conditioning the multiplexer means H2-J2 to accept data relating to the de-energizing off period for the motor 22. The first output of the duty cycle control word or PCO count (for controlling the off period) from step 62 in FIG. 3A, also shown at memory location 040E on the detail program listing on FIG. 4C, is 35Q (35 Octal) or an 8 bit binary count of 29. The binary count of 29 is gated into the counter means H3-J3 via the multiplexer means H2-J2, and, accordingly, after 226 $\phi 2/$ clock pulses, the terminal count of the counter means H3-J3 causes the flip-flop K3 to change states, thereby terminating the de-energizing off period and conditioning the multiplexer means H2-J2 to accept the data relating to the energizing on period. Several such cycles of alternately energizing and de-energizing motor 22 occur while the carriage means 12 is moving away from the home sensor 50 (FIG. 1). As soon as a signal is received from the home sensor 50, indicating that the carriage means 12 and the printer 14 thereon are out of the home position, the second duty cycle control word is output to the modulator 38 to repeat the process just described. The second duty cycle control word for controlling the off period of motor 22 is output at step 76 of FIG. 3A (also shown at memory location 0431 of the detail program listing in FIG. 4C), the count which is output being 37Q (37 octal) or an 8 bit binary count 31. The first duty cycle control word is used for an up-ramping function to get the carriage means 12 moving, and the second duty cycle control word is used to get the carriage means 12 moving at approximately the desired velocity. This second duty cycle control word or count is adjusted, if necessary, either upwardly by one or downwardly by one as the carriage means 12 moves, respectively, below and above the desired nominal velocity or speed.

The count which represents the desired nominal speed and which is used for comparison with the actual speed of the carriage means 12, as for example in step 82 of FIG. 3B and correspondingly in memory location 0415 0430 of the detail program listing shown in FIG. 4C is 141Q (141 Octal) or an 8 bit binary count of 97. The timer counter (step 58 in FIG. 3A) is initialized by loading a binary count of 127 therein, and it is decremented by the loop factors for the associated operational loops shown in FIGS. 3D and 3E as these operational loops are completed. The following chart illustrates the various counts which may typically be obtained when the carriage means 12 is moving above, below, or equal to the desired nominal velocity.

| Binary Count For Desired Nominal Velocity | Carriage Means 12 Moving Too Fast | Carriage Means 12 Moving Too Slowly |
|---|---|---|
| 97 | 127 − 29 (Loop Factors) | 127 − 31 (Loop Factors) |
|  | 98 Present Speed Count | 96 Present Speed Count |

From the above, when the carriage means 12 is moving too fast, the timer counter would be decremented by 29 or fewer loop factors (between successive interrupt or CHAR signals) and when the carriage means 12 is moving too slowly, the timer counter would be decremented by 31 or more loop factors. Consequently, if the carriage means is moving too fast in the example given, a present speed count of 98 would be compared with the nominal speed count of 97 (as in step 82 of FIG. 3B) to indicate that the speed of the carriage means 12 is above the desired nominal velocity. If the present speed count obtained from the immediately prior sampling between successive interrupt or CHAR signals were a 97 (as stored in step 70 of FIG. 3A) an examination of the slope of the speed (as examined in step 84 of FIG. 3A) would indicate that the velocity of the carriage means 12 is increasing in addition to presently being above the desired nominal velocity; consequently, the duty cycle control word (PCO count) would be decremented by one in step 86 of FIG. 3B. Continuing with the example given, the second fixed duty cycle word which is a binary count of 31 would be decremented by one to make the new PCO count equal to a binary count of 30. The binary count of 30 is then output to the modulator 38 as previously described to extend the off period for the motor 22, thereby causing the carriage means 12 to slow down towards the desired nominal velocity. The present speed count of 98 which was just obtained in the example given is stored in step 70 of FIG. 3A to replace the immediately prior present speed count of 97 which was used in step 84 of FIG. 3B, and the new duty cycle control word or PCO count is stored in memory in step 88 of FIG. 3B for use in the next speed evaluation and adjustment procedure which occurs after each 12 interrupt or CHAR signals. From what has been described, it is apparent that a decrease in the PCO count when output to the modulator 38 causes an increase in the duration of the off period to the motor 22 to lower the speed of the carriage means 12, that an increase in the PCO count causes a decrease in the duration of the off period to increase the speed of the carriage means 12, and that no change in the PCO count maintains the same duration of the off period as the last speed evaluation period to thereby maintain the speed of carriage means 12 at that of the last speed evaluation period. It is apparent that maintaining a fixed energizing on period for the motor 22 while shortening the de-energizing off period enables the motor 22 to be turned on sooner to speed up the carriage means 12 when compared to increasing the de-energizing off period. While this invention is described as modulating the de-energizing off period of the motor 22, it is contemplated that the principles disclosed herein could be utilized to modulate the energizing on period of the motor 22 while maintaining the de-energizing off period as fixed.

As previously stated, the steps shown in FIGS. 3D and 3E comprise the normal processing steps represented by the step 80 shown in FIG. 3A; these are the steps which relate to the usual conventional printing functions associated with the wire matrix printer 14 while the printer 14 is in motion; however, the steps are arranged in operational loops having the same basic machine cycle time (loop factor) or multiples thereof. For example, the various operational loops shown in FIGS. 3D and 3E were designed to effect the associated printing functions and then the lowest machine cycle time for the various loops shown was ascertained and considered to be the basic machine cycle time. The remaining loops not having the basic machine cycle time were either re-arranged to have the same basic machine cycle time or were padded, time-wise, with idle operations so as to have the cycle times occur in multiples thereof. For example, the operational loop between steps 152 and 154 of FIG. 3E has a machine cycle time (for processor 30) of 43 microseconds which represents the smallest machine cycle time or the basic machine cycle time; this operational loop is also shown at memory locations 49B on FIG. 4E of the detail program listing. A loop factor of 6 was applied to this basic machine cycle time to facilitate the handling of the loop factors of the various operational loops to arrive at loop factors which are whole numbers. All other operational loops are equal in time to the one described in the previous sentence, or are multiples thereof. For example, the loop factor associated with step 120 of FIG. 3D is equal to 1.5 times the basic machine cycle time (loop factor of 6) or 9. Because the various operational loops shown in FIGS. 3D and 3E may be conventional (aside from the arrangement of the cycle times of the operational loops as just described) they shall be described only briefly herein.

Figure 3F:
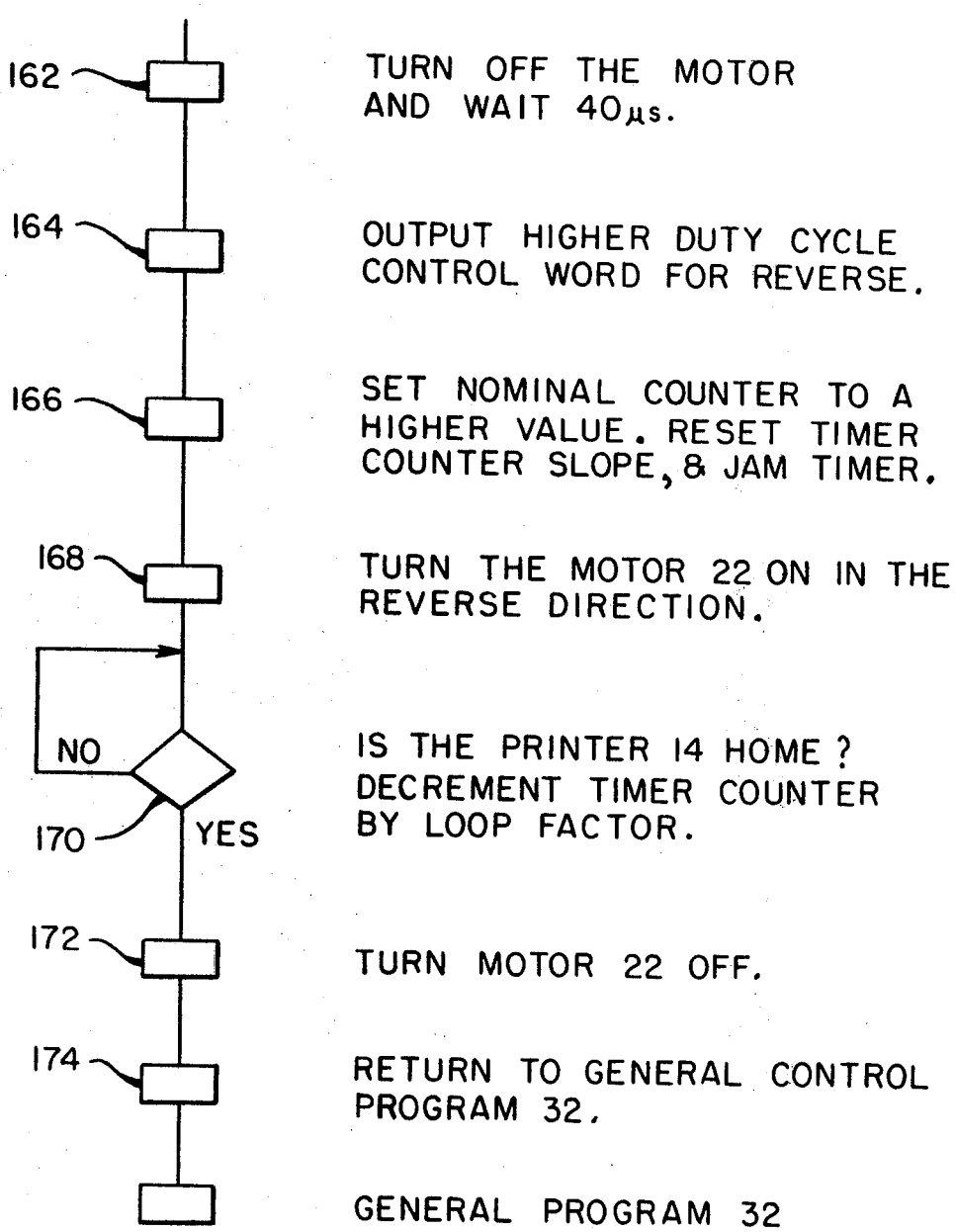

At step 120 in FIG. 3D, the information for what is to be printed and the location of the print field is obtained from the general program 32. The timer counter is then decremented by the loop factor, which in this step, is 9. The step "decrement timer counter by loop factor" shall be hereinafter referred to as step "DTCBLF." At step 122, the question, "Is there anything else to print?" is evaluated. If yes, the program 34 proceeds to step 124, at which the question, "Is this the end of a print field?" is evaluated. If "No", the program 34 proceeds to step 128 and the step DTCBLF is performed. At step 128 a character to be printed is obtained, and the particular position along the platen 10 for printing is obtained in step 130. At step 132 the question, "Is it a shift in character?" is evaluated. This simply relates to the formatting of a character for standard printing vs. Japanese printing. If "No" at step 132, the program 34 proceeds to step 134 which relates to calculations which are conventionally performed to select the type of character, i.e., a Japanese or a standard English character that is to be printed. At step 136, a conventional algorithm is used to select the appropriate print pattern for the column being printed, and the step DTCBLF is performed. At step 138, the question, "Is the printing enhanced?" is evaluated. Enhanced printing is simply a style of printing characters twice as wide as they are normally printed. At step 138, the step DTCBLF is also performed. If "Yes" at step 138, the program 34 shifts to an enhanced print routine represented by block 140 in FIG. 3G); because the enhanced print routine may be conventional and is not important to this invention, it is not described in any further detail. If "No" at step 138, the program 34 shifts to step 142 in FIG. 3E where the print image to be fired is stored in a print buffer associated with the processor 30, and the step DTCBLF is also performed. At step 144 the question "Is this the last image for this character?" is evaluated. If "No", the step 142 is repeated, and, if "Yes", the program 34 proceeds to step 146 where the question, "Has the jam timer timed out?" is evaluated, and the step DTCBLF is performed. If the jam timer has timed out, it means that a jam has occurred to prevent the carriage means 12 from moving, and therefore, the jam routine shown as block 148 is started to shut everything down until the jam is corrected. If "No" at step 146, the program 34 proceeds to step 150 where the question, "Is the printer 14 at the proper print column yet?" is evaluated, and the step DTCBLF is performed. At this time, the printer 14 is being moved along the platen 10 and if it has not yet arrived at the proper print location, step 146 is repeated; the interrupts or CHAR signals coming from the velocity sensing means 40 are utilized to ascertain the appropriate print location. If "Yes" is obtained at step 150, the next question, "Is the printer 14 at the proper fire pulse for this character?" is evaluated at step 152. If "No", step 154 evaluates whether or not the jam timer has timed out as yet (meaning that a jam has occurred). If no jam has occurred at step 154, then step 152 is repeated until a "Yes" has occurred. If a "Yes" results from step 154, the program 34 jumps (at step 156) to the jam routine previously mentioned in step 148. When a "Yes" occurs at step 152, the image for the print column to be printed is output at step 158 to the associated solenoids 42 (FIG. 1) of the printer 14 to print the vertical column of dots associated with the character being printed. At step 160, the question, "Is this the last image or 'vertical column of dots' for this character?" is evaluated. If "No" at step 160 the program 34 shifts to step 150 to repeat the steps following step 150 until a "Yes" results from step 160; whereupon the program shifts to step 122 in FIG. 3D. If there is nothing else to print in step 122, the program 34 shifts to block 126 which represents the routine to return the printer 14 to the home position via the particular routine shown in FIG. 3F.

At step 162 in FIG. 3F, the motor 22 is turned off in preparation for reversing it to the home position (near home position sensor 50 in FIG. 1). A forty microsecond delay also exists in step 162 to enable the power transistors associated with the motor drive means 26 to cool off to prevent damage to them. In step 164 a duty cycle control word for the "off" period for reverse movement of the printer 14 is output to the modulator 38 as previously described for the forward movement; however, the duty cycle control work for reverse is an eight bit binary count of 40 or an octal count of 50 as seen in memory location 03A6 in FIG. 4A of the detail program listing. This binary count of 40 provides a shorter de-energizing off period when compared to that used for moving the carriage means 12 in the forward direction to thereby move the carriage means 12 to the home position at a reverse rate which is faster than the forward rate. The nominal speed count which is used for comparing the actual speed of the carriage means in reverse is set in step 166 to an eight bit binary count of 126; this count is shown as 176Q (octal) at memory location 03AD of the detail program listing in FIG. 4A. The timer counter, the jam timer, and the slope word (immediately prior present speed count) are reset in step 166. In step 168, the motor 22 is turned on in the reverse direction and the motor 22 drives the carriage means 12 towards the home position. The modulator 38 will cause an energizing on period and a de-energizing off period to be alternated to the motor 22 as previously described. At step 170 the question, "Is the printer 14 home?" is evaluated, and the timer counter is decremented by a loop factor of 6 each time step 170 is repeated. Step 170 in FIG. 3F provides the means for obtaining the elapsed time between successive interrupts or CHAR signals for obtaining the actual velocity of the carriage means 12 while moving towards the home position.

As the carriage means 12 begins to move towards the home position, an interrupt or CHAR signal will be received each time a clear slot in the timing strip 48 is encountered. As soon as an interrupt or CHAR signal is received, the interrupt service routine shown generally in FIG. 3G is initiated; it should be recalled that this is the routine which begins on memory location 02FB on FIG. 4A of the detailed program listing. At step 176 the jam timer and an interrupt flip-flop are reset; the interrupt flip-flop is simply used by the processor 30 to indicate when the processor is in the interrupt mode for a speed evaluation and adjustment (if necessary). In step 178, the interrupt counter is decremented by one leaving a count of 11 thereon in the example being given. Because this is not the 12th interrupt as evaluated in step 180, the program 34 proceeds to step 182 where the present speed count (as recorded on the timer counter) is stored, as was done in step 70 of FIG. 3A. In step 184, the timer counter is reset and in step 186 the program 34 returns to step 170 of FIG. 3F where it remains until another interrupt or CHAR signal is received. When the next CHAR signal is received, the program 34 then jumps to step 176 of FIG. 3G where the process just described is repeated until a 12th interrupt is recorded on the interrupt counter in step 180 of FIG. 3G. Upon receiving the 12th interrupt at step 180, the program 34 shifts to block 188 of FIG. 3G which causes a jump to step 82 of FIG. 3B of the speed control program 34 to proceed with the succeeding steps already explained in relation to controlling the velocity of the carriage means 12 in a forward direction. From step 92 of FIG. 3B, the program 34 returns to step 64 of FIG. 3A and proceeds to step 78. Because the speed of the carriage means 12 has just been evaluated and adjusted (if necessary) another immediate 12th interrupt would not occur at step 78 in FIG. 3A; consequently, the program 34 would proceed to the block 80 for normal program processing, which in this instance, means returning to step 170 of the printer home routine of FIG. 3F. In this regard, whenever the program 34 is interrupted by an interrupt or CHAR signal, the program 32 returns to the particular step or memory location at which the interrupt occurred. As the carriage means 12 is moved to the home position, its velocity is continuously evaluated and adjusted (if necessary) every 12th interrupt or CHAR signal as just described until the home sensor 50 indicates that the carriage means 12 is in the home position in step 170 of FIG. 3F. Consequently, at step 172, the motor 22 is turned off, and at step 174, the speed control program 34 returns the control to the general program 32 by which other operations, not important to this invention, are performed.

The modulator 38, shown in FIG. 1, is shown in more detail in FIGS. 2A and 2B, and its operation has already been generally described. The port F is a conventional input/output port which consists of an 8 bit latch with tristate output buffers along with control and device selection logic by which all the principal peripheral and input/output functions of a microcomputer system can be implemented; a standard port such as port 8212 manufactured by Intel Corporation was used in this embodiment. The various pin connection terminals for the port F are shown. The general reset signal coming from the printer control means 28 is fed to pin 14 of port F, and the port select input and the I/O WR (write) signals coming from the processor 30 are fed to pins 1 and 13, respectively, of the port F and are used to transfer the data from the processor 30 to the port F over the tristate data bus DB0-DB7. Pin 2 of port F is connected to a source of positive potential through a 1000 ohm pull-up resistor R3. The term N.C. as used in FIGS. 2A and 2B means "no connection" to the associated pins of the various circuit modules shown therein.

The interface circuitry 36 shown in FIG. 1 is conventional and not important to this invention and consists of standard ports such as the Intel 8212 port to enable the processor 30 to communicate with the selected elements to effect data transfer to and from the processor 30. For the sake of convenience, the FWD/REVERSE line to the motor drive means 26 in FIG. 1 is shown as a separate line; however, a port similar to port F is used to transfer this data over the data bus lines DB0-DB7 to the motor drive means 26 by selecting the appropriate port at the appropriate time.

Each of multiplexers H2 and J2 (FIG. 2A) is a quad, two-input digital multiplexer circuit such as the 9322 multiplexer manufactured by Fairchild Semiconductor. The Q output from pin 6 of flip-flop K3 (FIG. 2B) is fed into pin 1 of multiplexer H2 and pin 1 of multiplexer J2 to select the data which is gated therethrough as previously explained.

Each of the counters H3 and J3 (FIG. 2B) is a four-bit binary counter such as the 9316 four-bit binary counter manufactured by Fairchild Semiconductor. The counters H3 and J3 are conventionally wired together to function as an eight bit binary counter with counter H3 handling the low, four-bit byte of data and counter J3 handling the high, four-bit byte of data. Each of these counters H3 and J3 is reset by the general reset mentioned earlier herein and is incremented by the $\phi2$/clock being fed to the associated pins 2 thereof. The $\phi2$/clock is obtained from a conventional inverter I-1 which receives a $\phi2$ clock of 1.42 mhz from the printer control means 28. Pin 15 of counter H3 is connected to pins 7 and 10 of counter J3, and the parallel enable pins 9 of these two counters are wired together. The terminal count (TC) output (pin 15) of counter J3 is fed into the J input (pin 2) of the flip-flop K3 which is a conventional 9024 flip-flop manufactured by Fairchild Semiconductor. The TC output from counter J3 is also fed through a conventional inverter I-2 to the K input (pin 3) of flip-flop K3. The S input (pin 5) of flip-flop K3 is connected to a +5 volt source of potential via a 1K ohm resistor R2. The $\overline{Q}$ output (pin 7) of flip-flop K3 is inverted by conventional inverter I-3 to become the PLSWDON signal which is fed to the motor drive means 26. The output of the inverter I-3 is connected to a +5 volt source of potential via a 2K ohm pull-up resistor R1. The $\phi2$ clock is fed into the cp input (pin 4) of flip-flop K3. The various VCC and ground connections for the various circuit elements shown in FIGS. 2A and 2B are shown.

FIGS. 4A-4H show detail program listings of the speed control program 34 shown in the flow charts of FIGS. 3A-3G. The interrupt service routine shown on FIG. 4A corresponds to that shown on FIG. 3G. The return carriage means 12 home routine shown on FIGS. 4A and 4B corresponds to that shown on FIG. 3F. The normal program processing shown on FIGS. 4C-4F corresponds basically to that shown on FIGS. 3D and 3E; however some of the operations shown in FIG. 4C are also shown in FIG. 3A. For example, memory location 040E of FIG. 4C corresponds to step 58 of FIG. 3A. The speed control routine shown on FIGS. 4F and 4G corresponds basically to that shown in FIGS. 3B and 3C. For example, memory location 521 of FIG. 4F corresponds to step 86 of FIG. 3B. The print routine shown on FIG. 4G corresponds to steps 130 through 136 of FIG. 3D, for example. The decrement timer routine shown on FIG. 4H corresponds to step 146, for example shown on FIG. 3E. The shut down routine shown on FIG. 4H corresponds to step 148 shown on FIG. 3E.

What is claimed is:

1. A system for controlling the velocity of a moveable member relative to a desired nominal velocity, comprising:

means for producing successive signals for incremental distances over which said moveable member is moved;

means for providing groups of operational steps for performing operations in addition to controlling the velocity of said moveable member, whereby each said group of operational steps has a time period associated therewith during which the associated group of operational steps is performed;

means for counting said time periods as the associated groups of operational steps are completed in an interval between said successive signals to provide a first count which corresponds to the actual velocity of said moveable member;

means for comparing said first count with a second count which represents said desired nominal velocity and including means for producing a third count which represents a desired velocity correction resulting from comparing said first and second counts;

a drive means alternately controlled by an energizing on period and a de-energizing off period for moving said moveable member; and means for receiving said third count and modulating one of said energizing on and de-energizing off periods to said drive means in accordance with said third count so as to modify the velocity of said moveable member, if necessary, to maintain said moveable member at said desired nominal velocity.

2. The system as claimed in claim 1 in which said comparing means further includes means for storing said first counts whereby said counting means produces successive said first counts from successive said intervals to enable said comparing means to compare a most recent one of said first counts with a said first count from an immediately prior said interval to ascertain acceleration characteristics of said moveable member, which said acceleration characteristics are utilized in producing said third count.

3. The system as claimed in claim 2 in which said counting means includes a counter for counting said successive signals and to initiate said comparing of said first count with said second count upon reaching a predetermined number of said successive signals, and in which said storing means includes a location for storing said third count which is received by said receiving means, whereby said comparing means, upon ascertaining said acceleration characteristics, will:
  (a) modify said third count to reduce the actual velocity of said moveable member if said actual velocity is greater than said desired nominal velocity and is increasing;
  (b) leave said third count unchanged if the actual velocity of said moveable member is greater than said desired nominal velocity and is decreasing;
  (c) leave said third count unchanged if the actual velocity of said moveable member is less than said desired nominal velocity and said actual velocity is increasing; and
  (d) modify said third count to increase the actual velocity of said moveable member if said actual velocity is less than said desired nominal velocity and is decreasing.

4. The system as claimed in claim 3 in which said comparing means includes a processor and said modulating means modulates said de-energizing off periods.

5. A system for controlling the velocity of a moveable member relative to a desired nominal velocity with a processor, comprising:
  means for producing successive interrupt signals for equal distances over which said moveable member is moved;
  means for providing operational loops for said processor for performing operations in addition to controlling the velocity of said moveable member whereby each said operational loop has a loop factor associated therewith, wherein each said loop factor represents a time period during which the associated operational loop is performed;
  means for counting said loop factors as the associated said operational loops are completed in an interval between successive said interrupt signals to thereby provide a first count which corresponds to the actual velocity of said moveable member;
  means for comparing said first count with a second count which represents said desired nominal velocity for producing a third count which represents a desired velocity correction resulting from comparing said first and second counts;
  a drive means being controlled alternately by an energizing on period and a de-energizing off period for moving said moveable member; and
  means for receiving said third count and modulating said de-energizing off period in accordance with said third count so as to modify the velocity of said moveable member, if necessary, to maintain said moveable member at said desired nominal velocity.

6. The system as claimed in claim 5 in which said comparing means further includes means for storing said first counts whereby said counting means produces successive said first counts from successive said intervals to enable said comparing means to compare a most recent one of said first counts with a said first count from an immediately prior said interval to ascertain acceleration characteristics of said moveable member, which said acceleration characteristics are utilized in producing said third count.

7. The system as claimed in claim 6 in which said counting means includes a counter for counting said successive interrupt signals and to initiate said comparing of said first count with said second count upon reaching a predetermined number of said successive interrupt signals, and in which said storing means includes a location for storing said third count which is received by said receiving means, whereby said comparing means, upon ascertaining said acceleration characteristics, will:
  (a) modify said third count to reduce the actual velocity of said moveable member if said actual velocity is greater than said desired nominal velocity and is increasing:
  (b) leave said third count unchanged if the actual velocity of said moveable member is greater than said desired nominal velocity and is decreasing;
  (c) leave said third count unchanged if the actual velocity of said moveable member is less than said desired nominal velocity and said actual velocity is increasing; and
  (d) modify said third count to increase the actual velocity of said moveable member if said actual velocity is less than said desired nominal velocity and is decreasing.

8. The system as claimed in claim 7 in which said third count from said location is modified by decreasing it by a predetermined count to reduce the actual velocity of said moveable member and is correspondingly increased by said predetermined count to increase the actual velocity of said moveable member.

9. The system as claimed in claim 8 in which said receiving means includes a port for storing each said third count for use by said modulating means whereby said modulating means uses said last named third count until a subsequent third count is produced.

10. The system as claimed in claim 9 in which said modulating means includes:
  a second counter;
  means for producing an on period count which corresponds to said energizing on period;
  a multiplexer for alternately presetting said second counter with said on period count and said third count from said port;
  means for incrementing said second counter from said on period count and third counts preset thereupon to the terminal count thereof; and
  a flip flop for receiving the terminal counts from said second counter whereby a terminal count associated with said on period count causes said flip flop to change state thereby causing the termination of said energizing on period and conditioning said multiplexer to preset said third count on said second counter to initiate the start of said de-energizing off period, and whereby a terminal count associated with said third count causes said flip flop to change state thereby causing the termination of said de-energizing off period and conditioning said multiplexer to preset said second counter with said on period count to initiate the start of a subsequent energizing on period.

11. A printer, comprising:

a platen;

a print head; and means including a processor for controlling the velocity of said print head relative to a desired nominal velocity, comprising:

a drive means being controlled alternately by an energizing on period and a de-energizing off period for moving said print head along said platen;

means for producing successive interrupt signals for equal distances over which said print head is moved along said platen;

means for providing operational loops for said processor for performing operations in addition to controlling the velocity of said print head whereby each said operational loop has a loop factor associated therewith, wherein each said loop factor represents a time period during which the associated operational loop is performed;

means for counting said loop factors as the associated said operational loops are completed in an interval between successive said interrupt signals to thereby provide a first count which corresponds to the acutal velocity of said print head;

means for comparing said first count with a second count which represents said desired nominal velocity for producing a third count which represents a desired velocity correction resulting from comparing said first and second counts;

means for receiving said third count and modulating said de-energizing off period of said drive means in accordance with said third count so as to modify the velocity of said print head, if necessary, to maintain said print head at said desired nominal velocity.

12. The printer as claimed in claim 11 in which said comparing means further includes means for storing said first counts whereby said counting means produces successive said first counts from successive said intervals to enable said comparing means to compare a most recent one of said first counts with a said first count from an immediately prior said interval to ascertain acceleration characteristics of said print head, which said acceleration characteristics are utilized in producing said third count.

13. The printer as claimed in claim 12 in which said counting means includes a counter for counting said successive signals and to initiate said comparing of said first count with said second count upon reaching a predetermined number of said successive signals, and in which said storing means includes a location for storing said third count which is received by said receiving means, whereby said comparing means, upon ascertaining said acceleration characteristics, will:

(a) decrease said third count by one to reduce the actual velocity of said print head if said actual velocity is greater than said desired nominal velocity and is increasing;

(b) leave said third count unchanged if the actual velocity of said print head is greater than said desired nominal velocity and is decreasng;

(c) leave said third count unchanged if the actual velocity of said print head is less than said desired nominal velocity and said actual velocity is increasing; and (d) increase said third count by one to increase the acutal velocity of said print head if said actual velocity is less than said desired nominal velocity and is decreasing.

14. The printer as claimed in claim 13 in which said print head is a matrix printer and said operational loops contain operations such as the formatting of data to be printed and the firing of print actuators associated with the matrix printer, and in which said interrupt signals are utilized for said firing of said print actuators.

15. A method of controlling the velocity of a moveable member relative to a desired nominal velocity, comprising:

(a) producing successive signals for equal distances over which said moveable member is moved;

(b) providing groups of operational steps for performing operations in addition to controlling the velocity of said moveable member, whereby each said group of operational steps has a time period associated therewith during which the associated group of operational steps is performed;

(c) counting said time periods as the associated groups of operational steps are completed in an interval between said successive signals to provide a first count which corresponds to the actual velocity of said moveable member;

(d) comparing said first count with a second count which represents said desired nominal velocity to determine whether said moveable member is moving at a velocity which is greater than, less than, or equal to said desired nominal velocity;

(e) producing a third count which represents a desired velocity correction resulting from comparing said first and second counts;

(f) utilizing said third count to modulate one of an energizing on period and a de-energizing off period which are alternately fed to a drive means moving said moveable member to modify the velocity of said moveable member, if necessary, to maintain said moveable member at said desired nominal velocity.

16. The method as claimed in claim 15 in which said comparing step includes the step of storing said first counts whereby a most recent one of said first counts is compared in said comparing step with one of said first counts from an immediately prior said interval to ascertain acceleration characteristics of said moveable member, which said acceleration characteristics are utilized in said producing step.

17. The method as claimed in claim 16 in which said producing step includes the step of storing said third counts so that a said third count associated with said immediately prior interval is adjusted if necessary and thereafter utilized in said utilizing step, and said producing step comprises the steps of:

(g) modifying said third count from said immediately prior interval to reduce the actual velocity of said moveable member if the actual velocity of said moveable member is greater than said desired nominal velocity and is increasing as determined from said most recent first count;

(h) leaving said third count from said immediately prior interval unchanged if the actual velocity of said moveable member is greater than said desired nominal velocity and is decreasing as determined from said most recent first count;

(i) leaving said third count from said immediately prior interval unchanged if the actual velocity of said moveable member is less than said desired nominal velocity and is increasing as determined from said most recent first count; and (j) modifying said third count from said immediately prior interval to increase the actual velocity of said moveable member if the actual velocity of said moveable member is less than said desired nominal velocity and is decreasing as determined from said most recent first count.

18. The method as claimed in claim 17 in which said modifying step (g) is effected by reducing said third count from said immediately prior interval by one, and said modifying step (j) is effected by increasing said third count from said immediately prior interval by one; and in which said utilizing step comprises keeping said energizing on period constant and modulating said de-energizing off period.

19. A method of digitally controlling the velocity of a moveable member relative to a desired nominal velocity with a processor by alternately controlling the duration of an energizing on period and the duration of a de-energizing off period to a motor which is operatively moving said moveable member, comprising the steps of:

(a) producing successive signals for equal distances over which said moveable member is moved;

(b) providing groups of operational steps for performing operations in addition to controllig the velocity of said moveable member, whereby each said group of operational steps has a time period associated therewith during which the associated group of operational steps is performed;

(c) counting said time periods as the associated groups of operational steps are completed in an interval between said successive signals to provide a first count which corresponds to the actual velocity of said moveable member;

(d) comparing said first count with a second count which represents said desired nominal velocity to determine whether said moveable member is moving at a velocity which is greater than, less than or equal to said desired nominal velocity;

(e) producing a third count which represents a desired velocity correction resulting from comparing said first and second counts;

(f) utilizing said third count to modulate said de-energizing off period to said motor to modify the velocity of said moveable member, if necessary, to maintain said moveable member at said desired nominal velocity.

20. A method of controlling the velocity of a moveable member relative to a desired nominal velocity with a processor comprising:

(a) producing successive interrupt signals for equal distances over which said moveable member is moved;

(b) providing operational loops for said processor for performing operations in addition to controlling the velocity of said moveable member whereby each said operational loop has a loop factor associated therewith wherein each said loop factor represents a time period during which the associated operational loop is performed;

(c) counting said loop factors as the associated said operational loops are completed in an interval between successive said interrupt signals to thereby provide a first count which corresponds to the actual velocity of said moveable member;

(d) comparing said first count with a second count which represents said desired nominal velocity to determine whether said moveable member is moving faster or slower than said desired nominal velocity;

(e) producing a third count which represents a desired velocity correction resulting from comparing said first and second counts; and (f) utilizing said third count to modulate one of an energizing on period and a de-energizing off period which are alternately fed to a drive means moving said moveable member to modify the velocity of said moveable member, if necessary, to maintain said moveable member at said desired nominal velocity.

21. In a printer, a method of digitally controlling the velocity of a print head along a platen relative to a desired constant velocity with a processor by alternately controlling the duration of an energizing on period and the duration of a de-energizing off period to a motor which is operatively moving said print head, comprising the steps of:

(a) producing successive interrupt signals for equal distances over which said print head is moved;

(b) providing operational loops for said processor for performing operations in addition to controlling the velocity of said print head whereby each said operational loop has a loop factor associated therewith, wherein each said loop factor represents a time period during which the associated operational loop is performed;

(c) counting said loop factors as the associated said operational loops are completed in an interval between successive said interrupt signals to thereby provide a first count which corresponds to the actual velocity of said moveable member;

(d) comparing said first count with a second count which represents said desired nominal velocity to determine whether said print head is moving at a velocity which is greater than, less than, or equal to said desired nominal velocity;

(e) producing a third count which represents a desired velocity correction resulting from comparing said first and second counts;

(f) utilizing said third count to modulate said de-energizing off period to said motor to modify the velocity of said print head, if necessary, to maintain said print head at said desired nominal velocity.

22. The method as claimed in claim 21 in which said comparing step includes the step of storing said first counts whereby a most recent one of said first counts is compared in said comparing step with one of said first count from an immediately prior said interval to ascertain acceleration characteristics of said print head, which said acceleration characteristics are utilized in said producing step.

23. The method as claimed in claim 22 in which said producing step includes the step of storing said third counts so that a said third count associated with said immediately prior interval is adjusted if necessary and thereafter utilized in said utilizing step, and said producing step comprises the steps of:
- (g) modifying said third count from said immediately prior interval to reduce the actual velocity of said print head if the actual velocity of said print head is greater than said desired nominal velocity and is increasing as determined from said most recent first count;
- (h) leaving said third count from said immediately prior interval unchanged if the actual velocity of said print head is greater than said desired nominal velocity and is decreasing as determined from said most recent first count;
- (i) leaving said third count from said immediately prior interval unchanged if the actual velocity of said print head is less than said desired nominal velocity and is increasing as determined from said most recent first count; and
- (j) modifying said third count from said immediately prior interval to increase the actual velocity of said print head if the actual velocity of said print head is less than said desired nominal velocity and is decreasing as determined from said most recent first count.

24. The method as claimed in claim 23 in which said modifying step (g) is effected by reducing said third count from said immediately prior interval by one, and said modifying step (j) is effected by increasing said third count from said immediately prior interval by one.

* * * * *